(12) United States Patent
Wasowicz

(10) Patent No.: US 6,435,877 B2
(45) Date of Patent: Aug. 20, 2002

(54) PHONOLOGICAL AWARENESS, PHONOLOGICAL PROCESSING, AND READING SKILL TRAINING SYSTEM AND METHOD

(75) Inventor: Janet M. Wasowicz, Evanston, IL (US)

(73) Assignee: Cognitive Concepts, Inc., Evanston, IL (US)

( * ) Notice: Subject to any disclaimer, the term of this patent is extended or adjusted under 35 U.S.C. 154(b) by 0 days.

(21) Appl. No.: 09/910,575

(22) Filed: Jul. 20, 2001

Related U.S. Application Data

(62) Division of application No. 09/414,393, filed on Oct. 6, 1999.
(60) Provisional application No. 60/103,354, filed on Oct. 7, 1998.

(51) Int. Cl.[7] ............................................. G09B 11/00
(52) U.S. Cl. ....................................... 434/167; 704/256
(58) Field of Search ................................ 434/169, 167, 434/322, 156; 704/250–256

(56) References Cited

U.S. PATENT DOCUMENTS

| | | |
|---|---|---|
| 4,166,452 A | 9/1979 | Generales, Jr. |
| 4,285,517 A | 8/1981 | Morrison |
| 4,363,482 A | 12/1982 | Goldfarb |
| 4,457,719 A | 7/1984 | Dittakavi et al. |
| 4,482,681 A | 11/1984 | Weinblatt |
| 4,770,416 A | 9/1988 | Shimuzu et al. |
| 4,884,972 A | 12/1989 | Gasper |
| 5,122,952 A | 6/1992 | Minkus |
| 5,149,084 A | 9/1992 | Dalebout et al. |
| 5,387,104 A | 2/1995 | Corder |
| 5,456,607 A | 10/1995 | Antoniak |
| 5,513,126 A | 4/1996 | Harkins et al. |
| 5,562,453 A | 10/1996 | Wen |
| 5,579,469 A | 11/1996 | Pike |
| 5,649,826 A | 7/1997 | West et al. |
| 5,692,906 A | 12/1997 | Corder |
| 5,694,546 A | 12/1997 | Reisman |
| 5,727,950 A | 3/1998 | Cook et al. |
| 5,743,743 A | 4/1998 | Ho et al. |
| 5,743,746 A | 4/1998 | Ho et al. |
| 5,751,953 A | 5/1998 | Shiels et al. |
| 5,762,503 A | 6/1998 | Hoo et al. |
| 5,813,862 A | 9/1998 | Merzenich et al. |
| 5,836,771 A | 11/1998 | Ho et al. |
| 5,863,208 A | 1/1999 | Ho et al. |
| 5,884,302 A | 3/1999 | Ho |

(List continued on next page.)

OTHER PUBLICATIONS

Assessment and Instruction in Phonological Awareness, Florida Dept. of Education (1999).
Auditory Processing Enhancement Programs, vol. 2: Auditory Discrimination/Phonological Awareness, Academic Communication Associates (1997).
C. Robertson et al., *The Phonological Awareness Test—Examiner's Manual*, LinguiSystems, Inc. (1997).
C.H. Lindamood et al., *The LAC Test (Lindamood Auditory Conceptualization Test) Revised Edition—Manual* (1971).
*Central Test Battery*, Precision Acoustics (1998).
*Innerlogic Reading Edge: Educator's Guide*, Innerlogic Software (1998).

(List continued on next page.)

*Primary Examiner*—Joe H. Cheng
*Assistant Examiner*—Kathleen M. Christman
(74) *Attorney, Agent, or Firm*—Gray Cary Ware & Freidenrich LLP

(57) ABSTRACT

A training tool for training and assessing one or more auditory processing, phonological awareness, phonological processing and reading skills of an individual is provided. The training tool may use various graphical games to train the individual's ability in a particular set of auditory processing, phonological awareness, phonological processing and reading skills. The system may use speech recognition technology to permit the user to interact with the games.

21 Claims, 32 Drawing Sheets

U.S. PATENT DOCUMENTS

| | | | |
|---|---|---|---|
| 5,885,083 | A | 3/1999 | Ferrell |
| 5,920,838 | A | 7/1999 | Mostow et al. |
| 5,927,988 | A | 7/1999 | Jenkins et al. |
| 5,934,909 | A | 8/1999 | Ho et al. |
| 5,934,910 | A | 8/1999 | Ho et al. |
| 5,944,530 | A | 8/1999 | Ho et al. |
| 5,957,699 | A | 9/1999 | Peterson et al. |
| 5,967,793 | A | 10/1999 | Ho et al. |
| 6,009,397 | A | 12/1999 | Siegel |
| 6,017,219 | A | 1/2000 | Adams, Jr. et al. |
| 6,019,607 | A | 1/2000 | Jenkins et al. |
| 6,036,496 | A | 3/2000 | Miller et al. |
| 6,074,212 | A | 6/2000 | Cogliano |
| 6,077,085 | A | 6/2000 | Parry et al. |
| 6,098,033 | A * | 8/2000 | Richardson et al. ............ 704/1 |
| 6,113,393 | A | 9/2000 | Neuhaus |
| 6,123,548 | A | 9/2000 | Tallal et al. |
| 6,146,147 | A | 11/2000 | Wasowicz |
| 6,159,014 | A * | 12/2000 | Jenkins et al. .............. 434/169 |
| 6,190,173 | B1 | 2/2001 | Jenkins et al. |
| 6,206,700 | B1 * | 3/2001 | Brown et al. ............... 434/116 |
| 6,210,166 | B1 | 4/2001 | Jenkins et al. |

OTHER PUBLICATIONS

J.K. Torgesen et al., *Test of Phonological Awareness: Examiner's Manual*, Pro–Ed, (1994).

J.K. Torgesen et al., "*TOWRE—Test of Word Reading Efficiency—Examiner's Manual*", Pro–Ed (1999).

Perceive & Respond vol. 1: Environmental Sounds—Second Edition, Academic Communication Associates (1997).

Perceive & Respond vol. 2: Listening for Auditory Differences—Second Edition, Academic Communication Associates (1997).

Perceive & Respond vol. 3: Auditory Sequential Memory—Second Edition, Academic Communication Associates (1997).

*Phonemic Awareness in Young Children: A Classroom Curriculum*, Chapter 10 by Paul H. Brookes Publishing Co. (1998).

R. Haaf et al., "Computer–Based Language Assessment Software: The Effects of Presentation and Response Format", *Language, Speech, and Hearing Services in Schools*, vol. 3, pp 68–74 (1999).

R.K. Wagner et al., "*CTOPP—Comprehensive Test of Phonological Processing—Examiner's Manual*", Pro–Ed (1999).

Laura I. Goin et al., "Simon Sounds It Out, The Friendly way to build letter–sound connections", Don Johnston, 1996.

\* cited by examiner

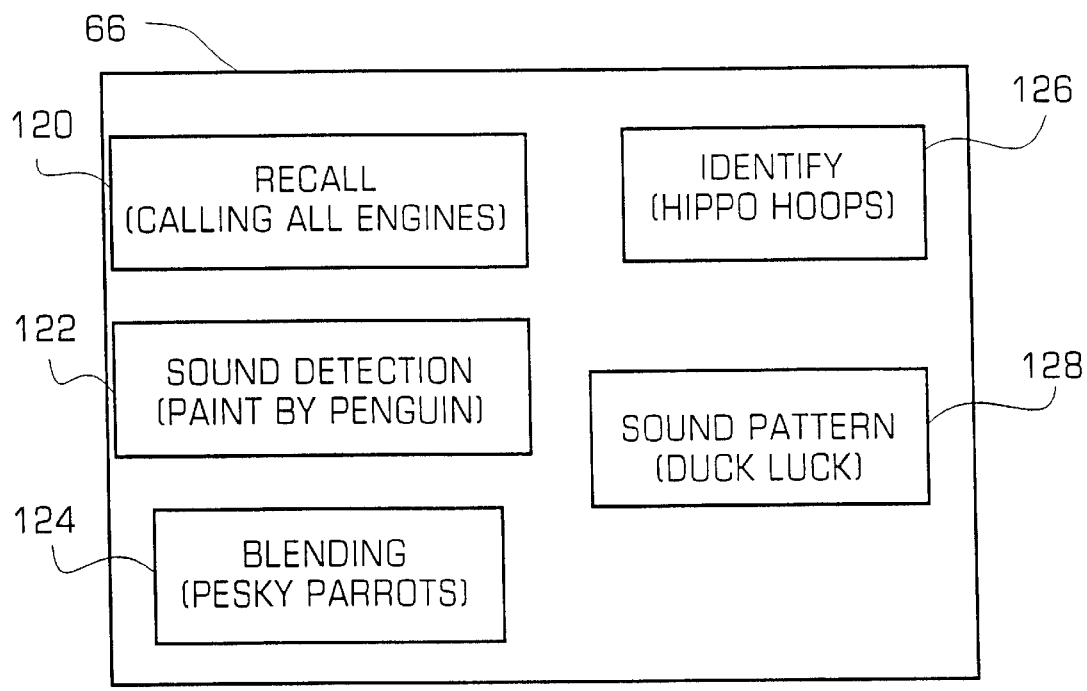
FIGURE 4
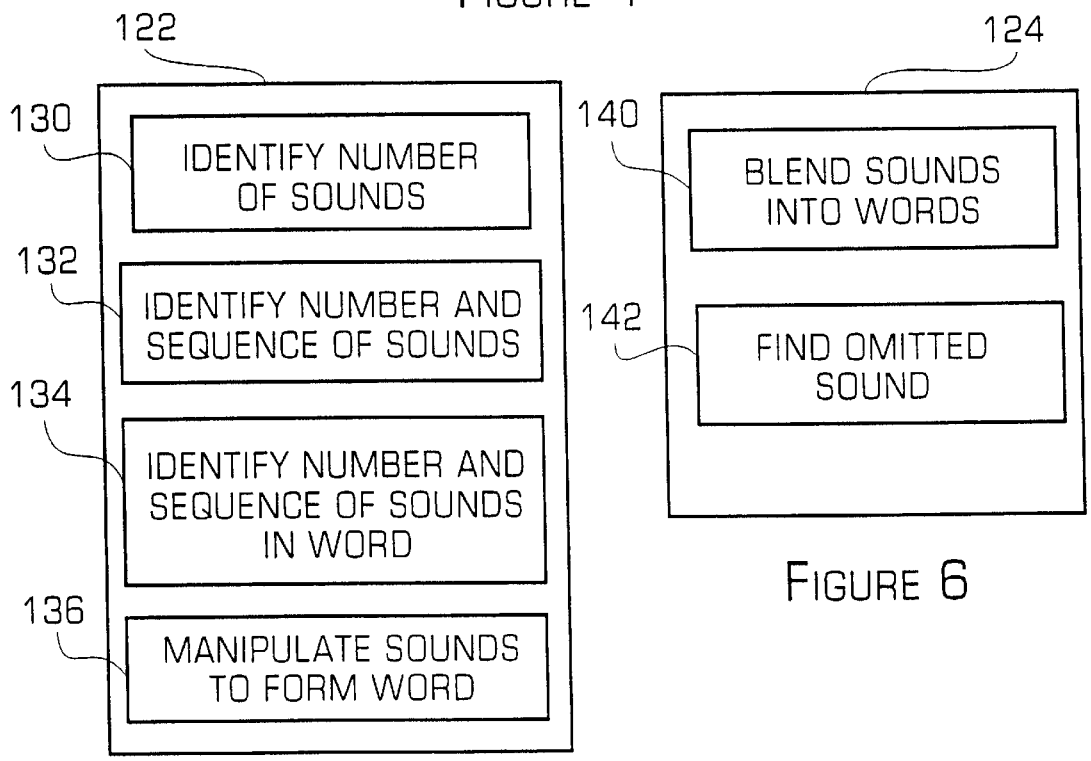
FIGURE 5
FIGURE 6

|       | MEN |      |      | WOMEN |      |      | CHILDREN |      |      |
|-------|-----|------|------|-------|------|------|----------|------|------|
| VOWEL | F1  | F2   | F3   | F1    | F2   | F3   | F1       | F2   | F3   |
| [i]   | 270 | 2300 | 3000 | 300   | 2800 | 3300 | 370      | 3200 | 3700 |
| [ɪ]   | 400 | 2000 | 2550 | 430   | 2500 | 3100 | 530      | 2750 | 3600 |
| [ɛ]   | 530 | 1850 | 2500 | 600   | 2350 | 3000 | 700      | 2600 | 3550 |
| [æ]   | 660 | 1700 | 2400 | 860   | 2050 | 2850 | 1000     | 2300 | 3300 |
| [ɑ]   | 730 | 1100 | 2450 | 850   | 1200 | 2800 | 1030     | 1350 | 3200 |
| [ɔ]   | 570 | 850  | 2400 | 590   | 900  | 2700 | 680      | 1050 | 3200 |
| [ʊ]   | 440 | 1000 | 2250 | 470   | 1150 | 2700 | 560      | 1400 | 3300 |
| [u]   | 300 | 850  | 2250 | 370   | 950  | 2650 | 430      | 1150 | 3250 |
| [ʌ]   | 640 | 1200 | 2400 | 760   | 1400 | 2800 | 850      | 1600 | 3350 |
| [ɝ]   | 490 | 1350 | 1700 | 500   | 1650 | 1950 | 560      | 1650 | 2150 |
| MEAN  | 500 | 1420 | 2400 | 575   | 1700 | 2800 | 670      | 1900 | 3250 |
| F2/F1 | 2.84 | | | 2.96 | | | 2.84 | | |
| F3/F2 | | 1.69 | | | 1.65 | | | 1.71 | |

VOWELS

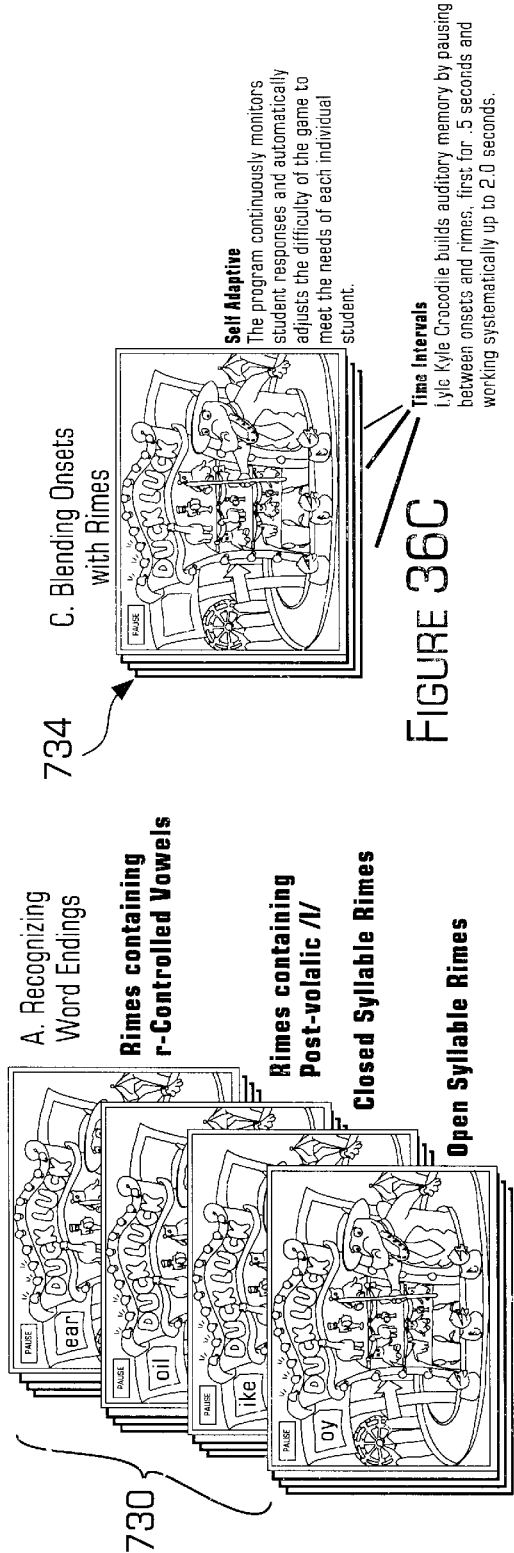

A. Recognizing Word Endings

Rimes containing r-Controlled Vowels

Rimes containing Post-volalic /l/

Closed Syllable Rimes

Open Syllable Rimes

FIGURE 36A

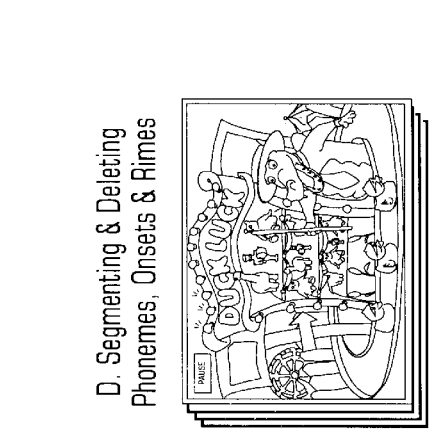

C. Blending Onsets with Rimes

Time Intervals
Lyle Kyle Crocodile builds auditory memory by pausing between onsets and rimes, first for .5 seconds and working systematically up to 2.0 seconds.

Continuous Scorecard
Immediate feedback is provided after each student response. The student is rewarded for each correct answer. If the student responds incorrectly, (s)he is shown the correct response.

Self Adaptive
The program continuously monitors student responses and automatically adjusts the difficulty of the game to meet the needs of each individual student.

FIGURE 36C

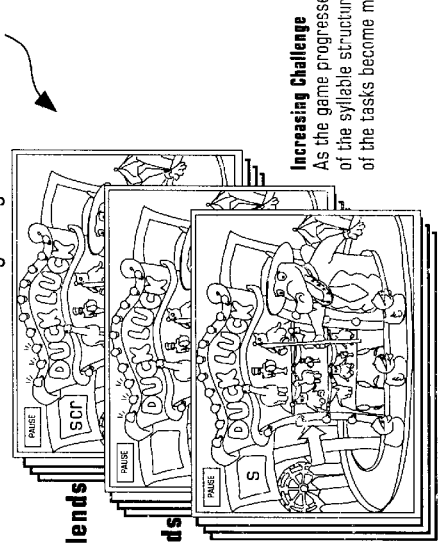

B. Recognizing Word Beginnings

3-Consonant Blends

2-Consonant Blends

FIGURE 36B

Increasing Challenge
As the game progresses, the complexity of the syllable structure and the difficulty of the tasks become more challenging.

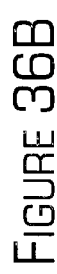

D. Segmenting & Deleting Phonemes, Onsets & Rimes

FIGURE 36D

PHONOLOGICAL AWARENESS, PHONOLOGICAL PROCESSING, AND READING SKILL TRAINING SYSTEM AND METHOD

RELATED APPLICATIONS

This is a divisional of application Ser. No. 09/414,393, filed on Oct. 6, 1999, entitled: PHONOLOGICAL AWARENESS, PHONOLOGICAL PROCESSING, AND READING SKILL TRAINING SYSTEM AND METHOD.

This application claims priority, under 35 USC § 120, from U.S. patent application Ser. No. 60/103,354 filed Oct. 7, 1998 and entitled "Adaptive Auditory and Phonological Apparatus and Method" which is incorporated herein by reference.

BACKGROUND OF THE INVENTION

This invention relates generally to a training and assessment system and method for training and measuring one or more different areas of phonological awareness, phonological processing, auditory processing, and reading skills in order to train the individual in the one or more different areas.

It is well known that a relationship exists between phonological processing abilities of an individual and the normal acquisition of beginning reading and spelling skills. For inefficient and disabled readers and spellers, the impasse exists in the perceptual and conceptual elusiveness of phonemes. Phonemes are the smallest units of speech that correspond to the sounds of our spoken language. Our phonologically based language requires that students have a sensitivity to and an explicit understanding of the phonological structure of words. This explicit understanding of the phonological structure of words is known as phonological awareness. Phonological awareness skills are displayed by an individual when the individual is able to isolate and identify individual sounds within words and to manipulate those identified sounds. Phonological processing refers to the use of information about the sound structure of oral language to process oral and written information. These include, for example, verbal short term memory, sequencing and language comprehension skills.

The English language has words that are comprised of sounds in some predetermined order. From the vast number of possible sequences of sounds, words in the English language actually use a relatively small number of sequences and the majority of these sequences are common to many words. A child who becomes aware of these common sound sequences is typically more adept at mastering these sequences when the words are presented in their printed form (i.e., when the child is reading the words) than a child who lacks this awareness of sounds. For example, the word "mat" has three distinct phonemes /m/, /ae/ and /t/. The words "sat" and "bat" have different initial phonemes, /s/ and /b/ respectively, but share the middle and final phonemes (/ae/ and /t/, respectively) that form the common spelling pattern "at". To a child with normal phonological awareness, our alphabetic orthography appears to be a sensible system for representing speech in writing. Thus, a child may employ the strategy of sounding out unknown words or letter sequences by analogy to known words with identical letter sequences. For example, the child may pronounce the unknown word "bat" by rhyming it with the known word "cat".

Phonological awareness skills are grouped into two categories including synthesis and analysis. Phonological synthesis refers to the awareness that separate sound units may be blended together to form whole words. Phonological analysis refers to the awareness that whole words may be segmented into a set of sound units, including syllables, onset-rimes and phonemes. Both analysis and synthesis skills have been identified as important prerequisites for achieving the goal of early reading skill proficiency and deficits of either and/or both of these skills are typically present in children with reading and spelling disabilities. Auditory processing skills, including the ability to perceive sounds and differences between sounds, provide an important foundation for building phonological awareness skills.

In addition to these phonological awareness skills, phonetic coding has been linked to efficient reading ability. Phonetic coding refers to the child's ability to use a speech-sound representation system for efficient storage of verbal information in working memory. The ability to efficiently use phonetic codes to represent verbal information in working memory may be measured by performance on memory span tasks for items with verbal labels. Children with reading problems have been found to perform poorly on memory span tasks for items with verbal labels. Thus, phonetic coding is an important skill for a reader. For a beginning reader, he/she must 1) first decode each sound in the word by voicing the appropriate sound for each symbol; 2) store the appropriate sounds in short term memory while the remainder of the symbols are being sounded out; and 3) blend all of the sounds from memory together to form a word. The efficient phonetic representation in verbal short term memory permits beginning readers to devote less cognitive energy to the decoding of sound symbol correspondence thus leaving adequate cognitive resources to comprehend what has been read.

Returning to the relationship between phonological processing and reading, an individual with good phonological processing skills and good phonological awareness tends to be better able to learn to read and spell. In addition, phonological processing deficits have been identified by researchers as the most probable cause of reading-related learning disabilities. Due to this link, many states have started to mandate phonological awareness training as part of regular classroom reading curricula. At the same time, school personnel are being required to be accountable and take responsibility for the classroom curriculum and the remedial reading services they provide. The problem is that it is difficult for untrained teachers to train a user's auditory processing, phonological awareness, processing and reading skills. Thus, it is desirable to provide an auditory processing and phonological awareness skill training system and method that overcomes the above problems and limitations of conventional training systems and it is to this end that the present invention is directed.

SUMMARY OF THE INVENTION

The auditory processing, phonological awareness, phonological processing. and reading skill training system in accordance with the invention may permit a user to improve the above, skills in order to become a better reader and better speller. The system may include one or more training modules that each train a different set of skills of the user. Each training module may include one or more tasks wherein each task may focus training on a particular skill of the user. Each module of the training system is adaptive so that users at various different skill levels will find the training modules challenging. In particular, each training module may change the difficulty of a task based on the past performance of the user. For example, in some training modules, the difficulty of the task is increased when the user provides a predetermined number (e.g., three) of sequential correct responses while the difficulty of the task is decreased when the user provides a predetermined number (e.g., 2) of sequential incorrect responses. Thus, the system ensures that the current task is at a difficulty level that is sufficiently challenging to challenge the user's skills but not too difficult to discourage the user from continuing the training.

In accordance with the invention, each training module may change one or more different difficulty variables to change the difficulty of the particular training. For example, a sound recall module may change one or more linguistic modifiers. The one or more training modules may be a sound recall module, a sound detection module, a sound blending module, a sound identification module and a sound pattern recognition module.

Thus, in accordance with the invention, a tool for training one or more skills associated with the reading and spelling skills of an individual is provided. The training tool comprises one or more training modules that train a particular set of auditory processing, phonological awareness, phonological processing and reading skills so that the user's skills at the set of skills improves and means for generating a stimulus for the user for each training module, the stimulus comprising one or more of a graphical image and an audible sound. The training tool further comprises means for receiving a user response to one of the graphical images and audible sound presented by each module.

In accordance with another aspect of the invention, a method for training a user to recognize and distinguish a sound is provided. The method comprises presenting a first and second sound to the user wherein each sound has a particular set of acoustic components (i.e., one or more of frequency, energy and duration) that distinguish the two sounds and altering an acoustic component of the first sound to be recognized by the user by a predetermined amount in order to make the sound more similar to the second sound so that the first sound is more difficult to distinguish from the first sound. The method further comprises continuing to alter the acoustic component of the first sound until the first and second sound are identical. The modified acoustic components in accordance with the invention may include frequency changes and changes in the voice onset time (duration acoustic component).

In accordance with another aspect of the invention, a method for training a user to discriminate a sound is provided wherein the phonetic context of sounds to be presented to the user is selected to change the perceptual saliency of the sounds in order to change the difficulty of discriminating the sounds wherein changing the ordering of the sounds is based on the phonetic context of the sounds. The method further comprises presenting a first and second sound to the user based on the selected phonetic context of the sounds.

In accordance with yet another aspect of the invention, a method for training a user to discriminate a sound is provided wherein a phonetic class of sounds to be presented to the user is selected to change the perceptual saliency of the sounds in order to change the difficulty of discriminating the sounds, wherein changing the ordering of the sounds is based on the inherent acoustic and phonetic properties of the sounds. The method further comprises presenting a first and second sound to the user from the phonetic class of sounds.

BRIEF DESCRIPTION OF THE DRAWINGS

FIG. 4 is a diagram illustrating an example of the games including in the training system in accordance with the invention;

FIG. 5 is a diagram illustrating an example of the tasks in the sound detection training module in accordance with the invention;

FIG. 6 is a diagram illustrating an example of the tasks in the blending sound training module in accordance with the invention;

FIGS. 36A–36D are diagrams illustrating examples of different views of the sound pattern identification training game of FIG. 35.

DETAILED DESCRIPTION OF A PREFERRED EMBODIMENT

The invention is particularly applicable to a computer based training system for training a child's auditory processing, phonological awareness, phonological processing and reading skills and it is in this context that the invention will be described. It will be appreciated, however, that the system and method in accordance with the invention has greater utility since 1) it may be used to test and teach a variety of other individuals, such as illiterate and cognitively-impaired people, individuals whose native language is not English who are learning to read, and adolescents and adults who read poorly and wish to improve their literary skills; and 2) the system may be implemented on other computer networks, such as the Web, the Internet, a local area network or the like.

Figure 1:
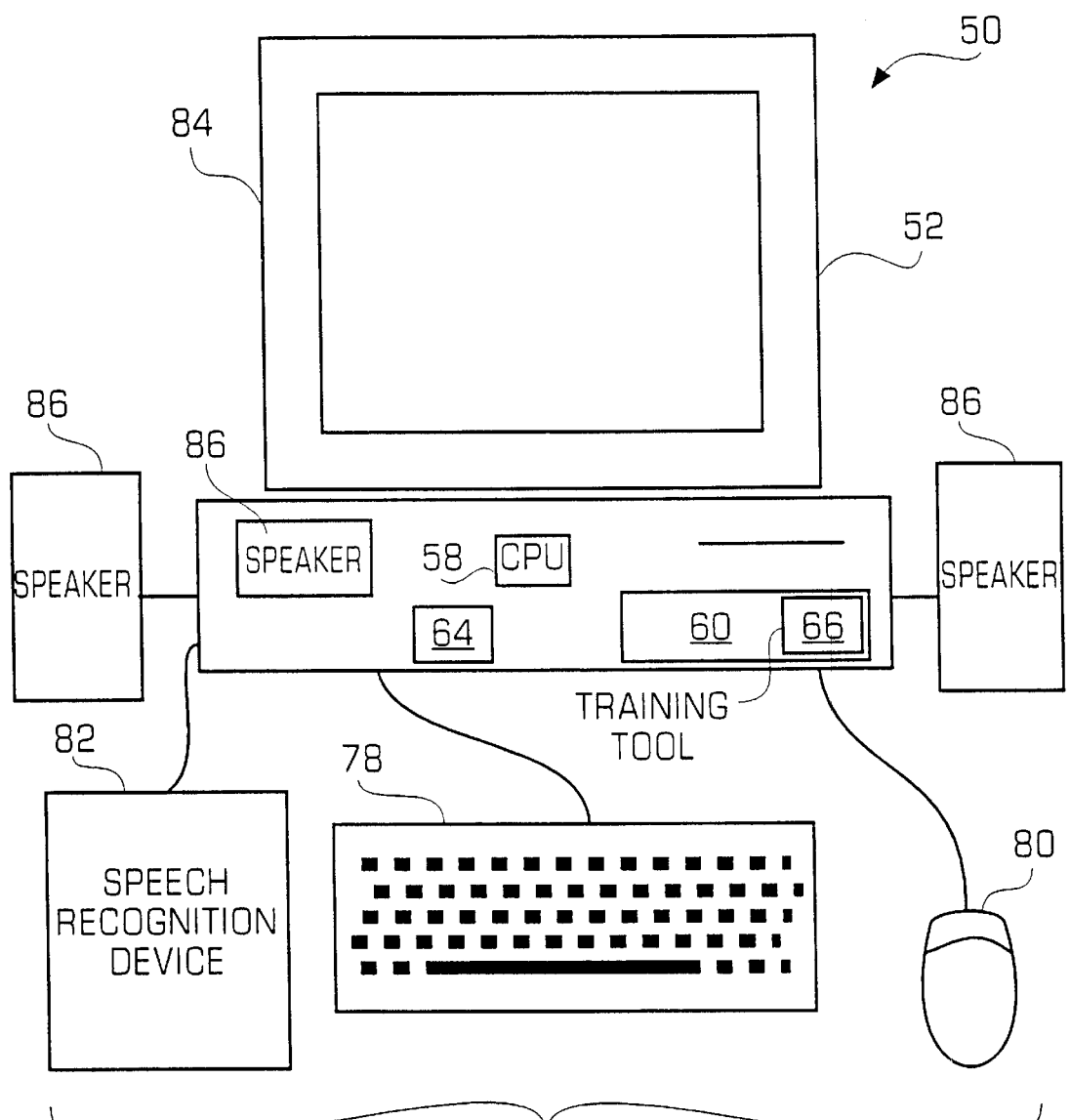
FIG. 1 is a block diagram illustrating a computer-based phonological skills training system in accordance with the invention.

FIG. 1 is a block diagram illustrating an embodiment of a computer-based auditory, phonological and reading skills training system 50 in accordance with the invention. In this embodiment, the training system 50 may be executed by a computer 52. The computer 52 may be a stand-alone personal computer or a computer connected to a network or a client computer connected to a server. For purposes of illustration, an embodiment using a stand-alone computer 52 will be described. The computer 52 may include a central processing unit (CPU) 58, a memory 60, a persistent storage device 64, such as a hard disk drive, a tape drive an optical drive or the like and a training tool 66. In a preferred embodiment, the training tool may be one or more software applications (training different auditory processing, phonological awareness and processing skills or reading skills) stored in the persistent storage of the computer that may be loaded into the memory 60 (as shown in FIG. 1) so that the training tool may be executed by the CPU 58. The computer 52 may be connected to a remote server or other computer network that permits the computer 52 to receive updates to the training tool over the computer network. The training tool may also be used in conjunction with the diagnostic system as described is U.S. patent application Ser. No. 09/350,791, filed Jul. 9, 1999 that is owned by the same assignee as the present application and is incorporated herein by reference.

The computer 52 may further include an input device 76 such as a keyboard 78, a mouse 80, a joystick, a speech recognition system 82 or the like, a display 84 such as a typical cathode ray tube, a flat panel display or the like and an output device 86 such as a speaker for producing sounds or a printer for producing printed output. The input and output devices permit a user of the computer to interact with the training tool so that the user's skill at various auditory processing, phonological awareness, phonological processing and other reading skills are improved. For example, the speech recognition system permits the user to speak into the speech recognition system 82 in response to a stimulus from the training tool as described below. The computer 52 may also execute a browser software application in order to interact with the diagnostic system as described above and download one or more updates to the training tool.

As described below in more detail, the training tool may include one or more different tools that train various auditory processing, phonological awareness, phonological processing and reading skills so that a child's proficiency at auditory processing, phonological awareness and processing skills and reading skills may be increased. The training tool 66 may keep track of a user's scores in each skill area and adaptively change the difficulty of each game in the training tool based on the user's current skills. For example, the training tool may either increase or decrease the difficulty of the training. As described below, the training tool may alter one or more difficulty variables of a current training (e.g., interval between stimuli, similarly of two different words or sounds, level of background noise and the like) to change the difficulty of the training. Now, more details of the training tool will be described.

Figure 2:
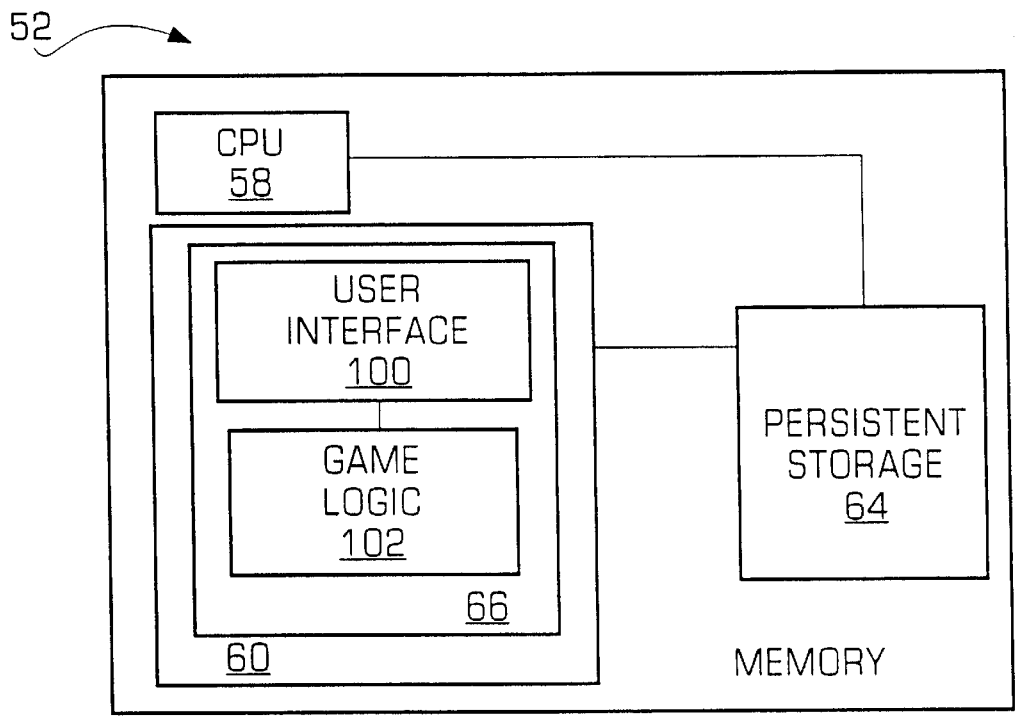
FIG. 2 is a diagram illustrating a preferred embodiment of the training tool of FIG. 1 in accordance with the invention including one or more tests that are used to train one or more skills.

FIG. 2 is a diagram illustrating more details of the computer 52 that may be a part of the training system of FIG. 1. The computer 52 may include the CPU 58, the memory 60, the persistent storage device 64 and the training tool 66. The training tool may further comprise a user interface (UI) 100 and game logic 102. The user interface may generate multiple images and audible sounds that are viewed and heard and responded to by the user using the input devices in order to train the user in various auditory processing, phonological awareness, phonological-processing and reading skill areas (the "skills"). The game logic 102 may store the one or more games that make up the training tool wherein each game may train the user in a different set of skills. The training tool in accordance with the invention may use games to train the user since the user may be a child that is more likely to be willing to learn when given a game to play. In other words, the child may be playing the game and, without realizing it, also training and improving a particular skill. The training tool may also obviously be implemented using similar games with different user interfaces for adult users. Now, more details of the training tool in accordance with the invention will be described.

Figure 3:
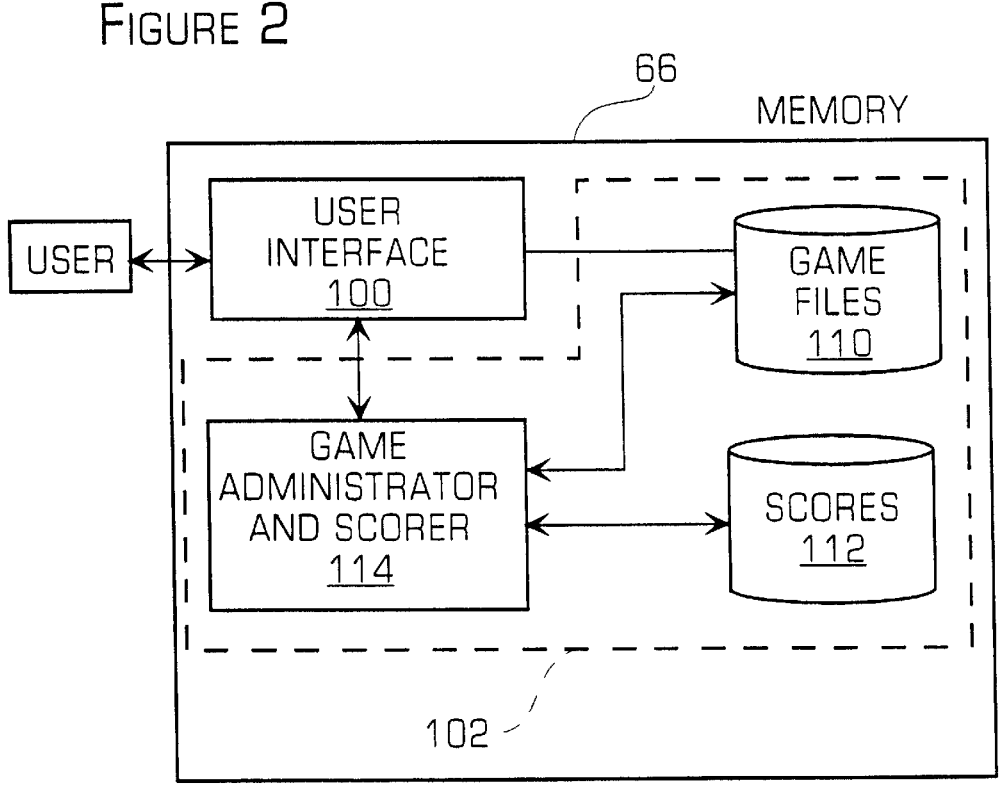
FIG. 3 is a diagram illustrating the blocks of the training system in accordance with the invention.

FIG. 3 illustrates more details of the training tool 66 that includes the user interface 100 and the game logic 102. In more detail, the game logic 102 may include a game file database 110, a score database 112 and a game administrator and scorer module 114. The game file database may store one or more games of the training tool wherein each game trains a different set of skills. Each game in the preferred embodiment will be described below with reference to FIGS. 4–36. As described above, the actual games contained in the training tool may be updated or changed. The score database 112 may store the scores for one or more users for the one or more games contained in the training tool. The score database 112 permits the user's progress at each skill to be monitored and analyzed. The game administrator and scorer module 114 controls which game is being played, the user interface for the particular game, the score of the particular game and the level of difficulty of each game. In this manner, the user of the training tool does not to keep track of his/her score or progress since the system may automatically track and report the scores and progress of the each user that uses the system. The administrator also permits one or more different users to user the training tool on the same computer and keep track of each user separately. The administrator 114 may also include statistical software applications (not shown) that permit the administrator 114 to, generate statistics about the one or more users using the training tool. Now, an example of the games included in the preferred embodiment of the training tool will be described.

FIG. 4 is a diagram illustrating an example of the games included in a preferred embodiment of the training tool 66 in accordance with the invention. The training tool 66 may include a sound recall module 120 (called "Calling All Engines" in this example), a sound detection module 122 (called "Paint by Penguin" in this example), a blending sound module 124 (called "Pesky Parrots" in this example), a sound identification module 126 (called "Hippo Hoops" in this example) and a sound pattern recognition module 128 (called "Duck Luck" in this example). Each of these games may train one or more skills as described below. For example, the recall sound module may train a user's skills at auditory attention, short term memory, figure-ground discrimination and sequential memory. Some of these games have one or more tasks that must be completed to complete the game. More details of the games is provided in the Appendix of the provisional application which is also incorporated herein by reference. While the sound recall module has one task, other modules have more than one task and an example of the tasks within each game will now be described.

FIG. 5 is a diagram illustrating an example of the tasks in the sound detection training module 122 in accordance with the invention. The sound detection module 122 may include a task 130 of identifying the number of sounds, a task 132 of identifying the number and sequence of sounds, a task 134 of identifying the number and sequence of sounds in a word and a task 136 of manipulating sounds to form words. These tasks, together, train a user's skill at auditory short term memory, sequential memory, temporal processing (i.e., temporal ordering and temporal resolution), pattern recognition, phoneme sequencing, phonological segmentation and phonological manipulation. In the first task 130, the user is asked to detect and identify the number of sounds in a series of sounds at different difficulty levels such as by varying the number of sounds presented to change the difficulty of the task. In the second task 132, the user is asked to detect and identify the number and sequence of sounds in a series of sounds and the changing of the number of sounds presented to the user is used to change the difficulty of the task. In a third task 134, the user is asked to detect and identify the number and sequence of sounds in a word. The identification of sounds in a word is more difficult than the identification of isolated sounds so this task is harder than the first two tasks. In the fourth task 136, the user is asked to manipulate a series of sounds to form a new word which is the hardest skill to learn. Thus, as the user's skills improve in a particular area, the task increases in difficulty until a user has mastered the skill. Each of these tasks will be described in more detail below with reference to FIGS. 15–20. Now, the tasks associated with the sound blending training module will be described.

FIG. 6 is a diagram illustrating an example of the tasks in the sound blending training module 124 in accordance with the invention. The module 124 may include a first task 140 of blending sounds into words and a second task 142 of identifying the omitted sound in a word. Together, these tasks train a user's skills at auditory short term memory, phonological blending, auditory and phoneme discrimination, word closure and auditory performance with degraded signals. In the first task 140, the user is asked to blend smaller units of sound separated by a varying time interval into a larger sound unit and select that larger sound unit wherein the varying time interval changes the difficulty of the task. In the second task 142, the user is asked to, when auditorily presented with a sequence of sound units that form a word except for an omitted sound unit, identify the missing sound unit and the word. These two tasks are described below in more detail with reference to FIGS. 21–24. Now, the tasks associated with the sound identification module will be described.

Figures 7, 8:
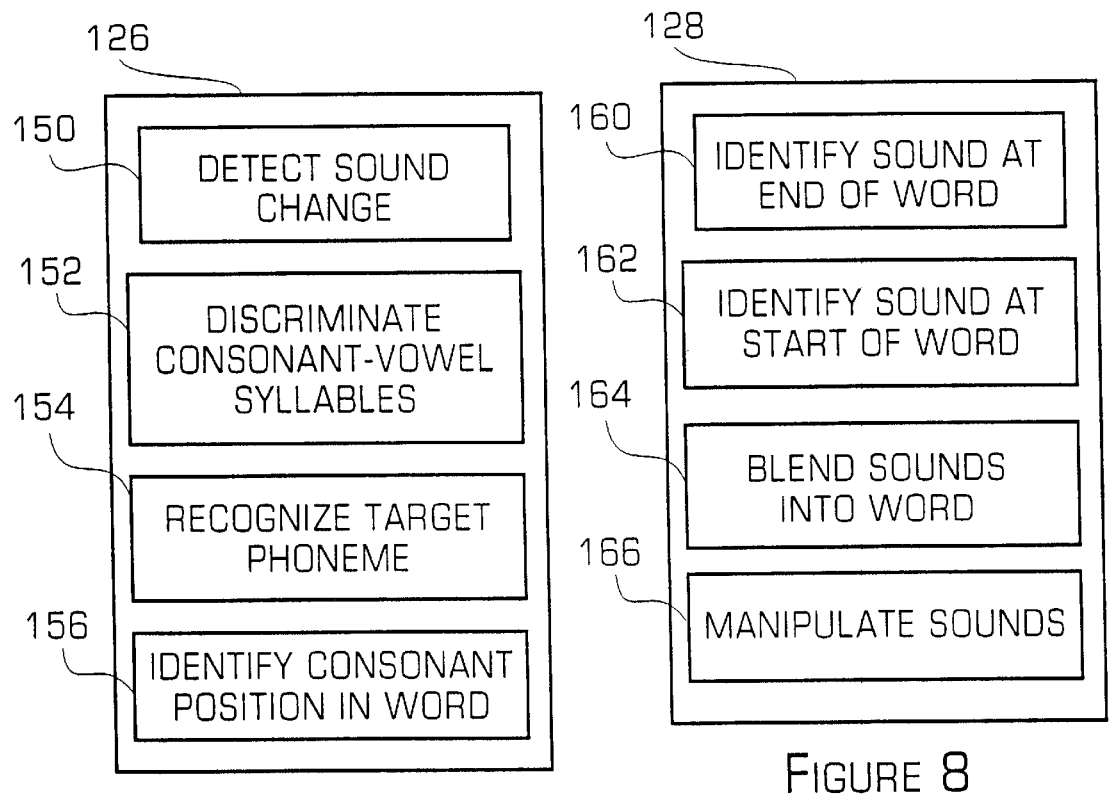
FIG. 7 is a diagram illustrating an example of the tasks in the sound identification training module in accordance with the invention.
FIG. 8 is a diagram illustrating an example of the tasks in the sound pattern training module in accordance with the invention.

FIG. 7 is a diagram illustrating an example of the tasks in the sound identification training module 126 in accordance with the invention. The module may include a first task 150 of detecting a sound change, a second task 152 of discriminating consonant-vowel syllables, a third task 154 of recognizing a target phoneme and a fourth task 156 of identifying the position of a phoneme in a word. The combination of these tasks trains the user's skills at auditory vigilance, auditory and phoneme discrimination, phoneme identification and phoneme sequencing. In more detail, the first task 150 asks the user to detect a change of sound in a series of sounds presented with an interval of preferably 1.0 seconds. In the second task, the user is asked to identify a pair of consonant-vowel (CV) syllables as being the same or different when the pair are separated by a time interval of preferably 1 second. In the third task, the user is asked to recognize a word in a series of words that contains a target phoneme when the words are separated by, preferably, a 2 second interval. In the fourth task, the user is asked to identify the position in a word of a consonant phoneme. These tasks will be further described with reference to FIGS. 25–30. Now, the tasks that make up the sound pattern training module will be described.

FIG. 8 is a diagram illustrating an example of the tasks in the sound pattern recognition training module 128 in accordance with the invention. In particular, the module may include a first task 160 of identifying a sound at the end of a word, a second task 162 of identifying a sound at the start of a word, a third task 164 of blending sounds into a word and a fourth task 166 of manipulating sounds. The combination of these tasks trains the user's skills at sight recognition, auditory sequential memory, short-term memory, phoneme identification, rhyming, auditory and phoneme discrimination, phonological blending, segmentation and manipulation and word closure. In more detail, in the first task 160, the user is asked to, when auditorily presented with a target sound or pattern of sounds, select a word from a set of responses that contains the same sound or sound pattern at the end of the word. In the second task 162, the user is asked to, when auditorily presented with a target sound or pattern of sounds, select a word from a set of responses that contains the same sound or sound pattern at the beginning of the word. In the third task 164, the user is asked to blend units of sound separated by a varying interval of time into a target word. In the fourth task 166, the user is asked to, when auditorily presented with a word and instructions to manipulate one or more sounds into the word, choose a word that matches the requested manipulation. More details of these tasks will be described below with reference to FIGS. 31–36. Now, a technique for acoustically modifying a sound in accordance with the invention will be described.

At various times, it is helpful to acoustically modify a sound or word to make to easier for a user to recognize the word or sound. That acoustic modification or enhancement may then be gradually removed from the word or sound as the user becomes better at recognizing the sound or word. In this manner, the acoustical modification in accordance with the invention may be used to adaptively train the user to recognize a word or sound. To better understand the acoustical modification in accordance with the invention, the acoustic difference between vowels will be described. However, the acoustic modification may also be used to modify consonants, vowel-consonant pairs, words and the like. In more detail, the acoustic modifications may include changing a acoustic component and may preferably include changing the frequency of sounds or changing the voice onset time of sounds.

Figures 9, 10:
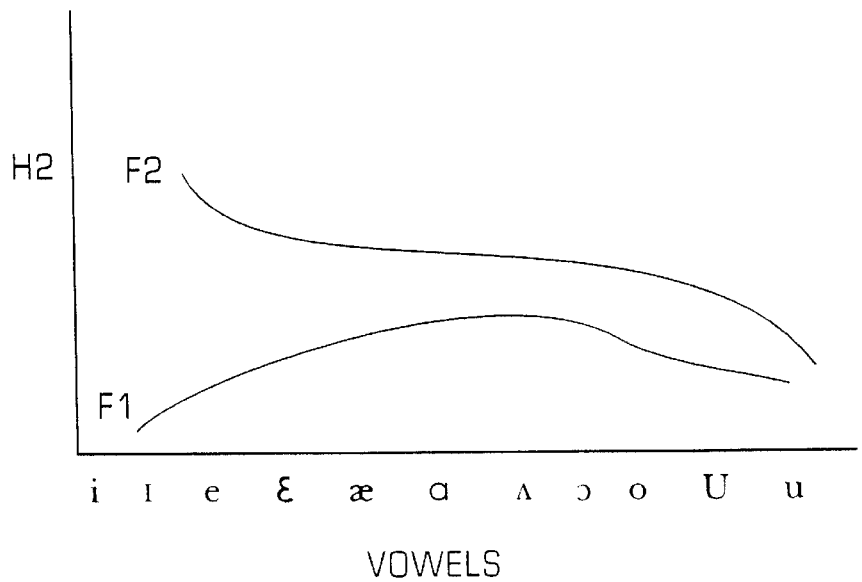
FIG. 9 is a chart illustrating the differences in frequencies for English language vowels.
FIG. 10 is graph of the acoustic vowel continuum.

FIG. 9 is a chart illustrating the differences in frequencies for English language vowels. In particular, the primary acoustic difference between vowels is their formant frequencies. In particular, as shown in FIG. 9, the average formant frequencies of the vowels are shown. As set forth in the chart, each vowel may include a first formant frequency (F1), a second formant frequency (F2) and a third formant frequency (F3) wherein the vowel is formed by the combination of these formant frequencies over a period of time. FIG. 10 is a graph showing the first and second (F1 and F2) frequencies for English language vowels. The chart may be known as the acoustic vowel continuum. In particular, each vowel along the horizontal axis is a step along the continuum. During the acoustic modification, the acoustic similarity of vowel pairs may be controlled by starting the user with recognizing pairs of vowels that are separated by, preferably, 4 or more steps along this continuum, such as /i-a/, for example. As the user masters the discrimination of those 4+ step vowel pairs, the training tool may become more difficult by having the user distinguish vowel pairs separated by three steps, then two steps and then one step, such as /i-I/, for example. Thus, the training tool may control the acoustic similarity of the vowel pairs based on their inherent F1 and F2 values. Now, the method of acoustic modification in accordance with the invention for consonant-vowel syllables will be described.

Figure 11A:
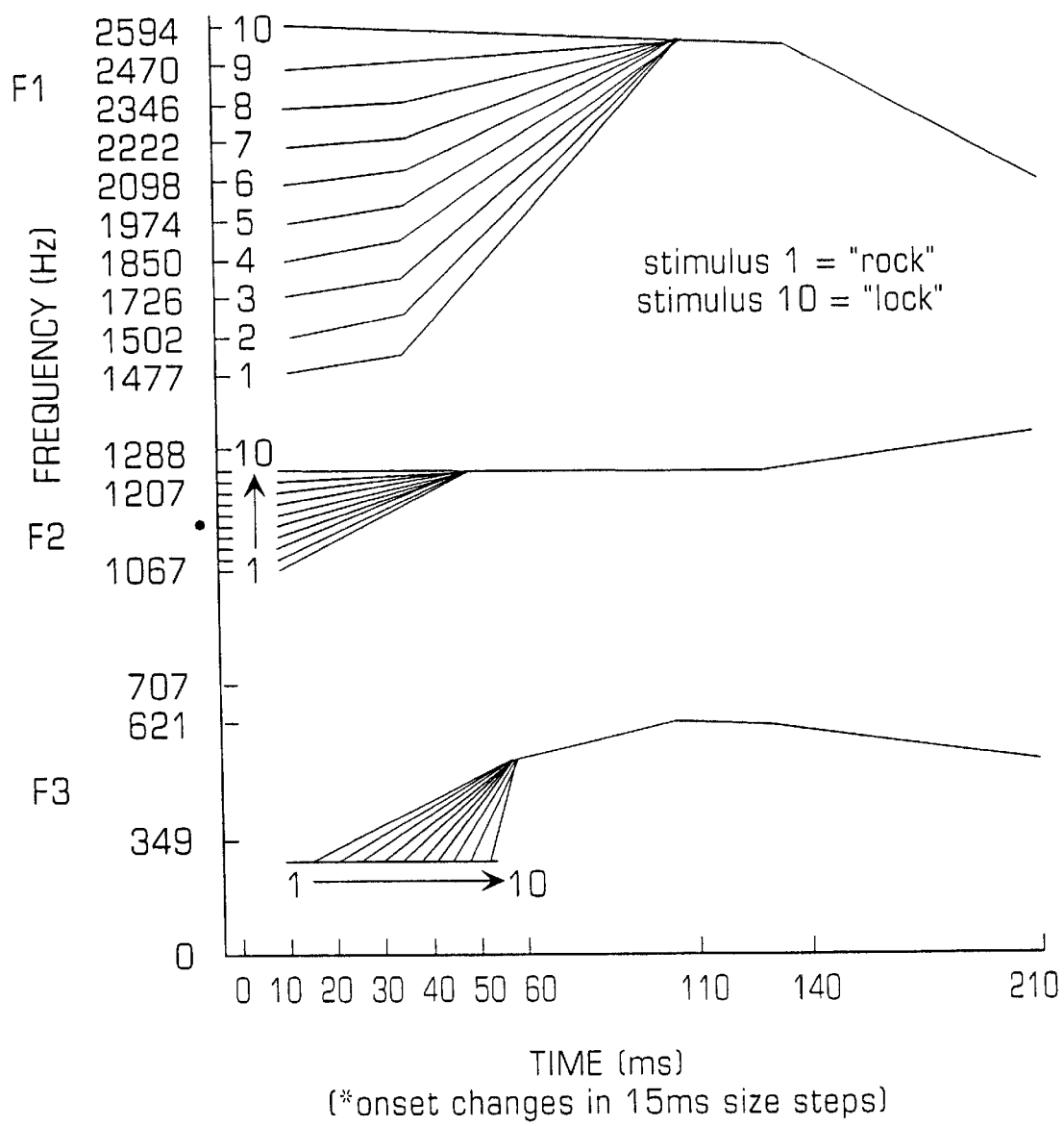
FIG. 11a is diagram illustrating varying frequencies for consonant- vowels syllables.

FIG. 11a is diagram illustrating varying frequencies for consonant-vowel (CV) syllables. In particular, the primary acoustic difference between r-l, m-n and d-g, for example, is the value of the second and third formant frequencies at the onset of the consonant. The graph in FIG. 11 illustrates how the formant frequencies (F1, F2 and F3) differ at onset for a perfect /r/ (shown as stimulus 1 in the chart)to a perfect /l/ (shown as stimulus 10 in the chart) with 10 steps in between. The number of steps between the two consonants may be adjusted such that a smaller or greater number of steps may be used. In accordance with the invention, the training tool may begin by presenting the user with the two stimuli with the greatest separation, such as stimulus 1 and 10 in the chart. As the user masters that combination, sounds with a smaller separation are used. In accordance with the invention, the above acoustic modification may be used for ra-la CV pairs, ma-na CV pairs and da-ga CV pairs. In accordance with the invention, the described acoustic modification may be used for other sounds including other CV pairs, and their inherent distinguishing acoustic properties in various modules and training tasks.

In addition to modifying sounds as described above, the acoustic modification may also be determined by the phonetic properties of the sounds in accordance with the invention. In particular, the acoustic modification may start with a group of tense-tense vowels pairs and then continue with other vowel pairs (e.g., tense-lax). The term "tense" describes a phonetic property of vowels (i.e., vowels that are produced with tense musculature of the articulators, primarily the tongue). Within this category, 2-step vowel pairs may preferably be used (e.g., /i-e/) although a different number of steps may be used. The next vowel pair may be a front tense-lax vowel pair (i.e., vowels produced in the front of the mouth and paired such that each pair contains one tense vowel and one lax vowel. Within this phonetic category of vowel pairs, a decreasing number of steps between the two sounds may be used. For example, /i-a/ and then /i-ae/ may be used. The next category of vowels is back tense-lax vowel pairs followed by front lax-lax pairs, followed by back lax-lax pairs. By selecting and training subgroups of vowels based on their phonetic properties (front vs. back and tense vs. lax) and then superimposing the method of gradual step size reduction, a more complex and effective method of training is produced. Now, changing the voice onset time (VOT) in accordance with the invention will be described in more detail.

Figure 11B:
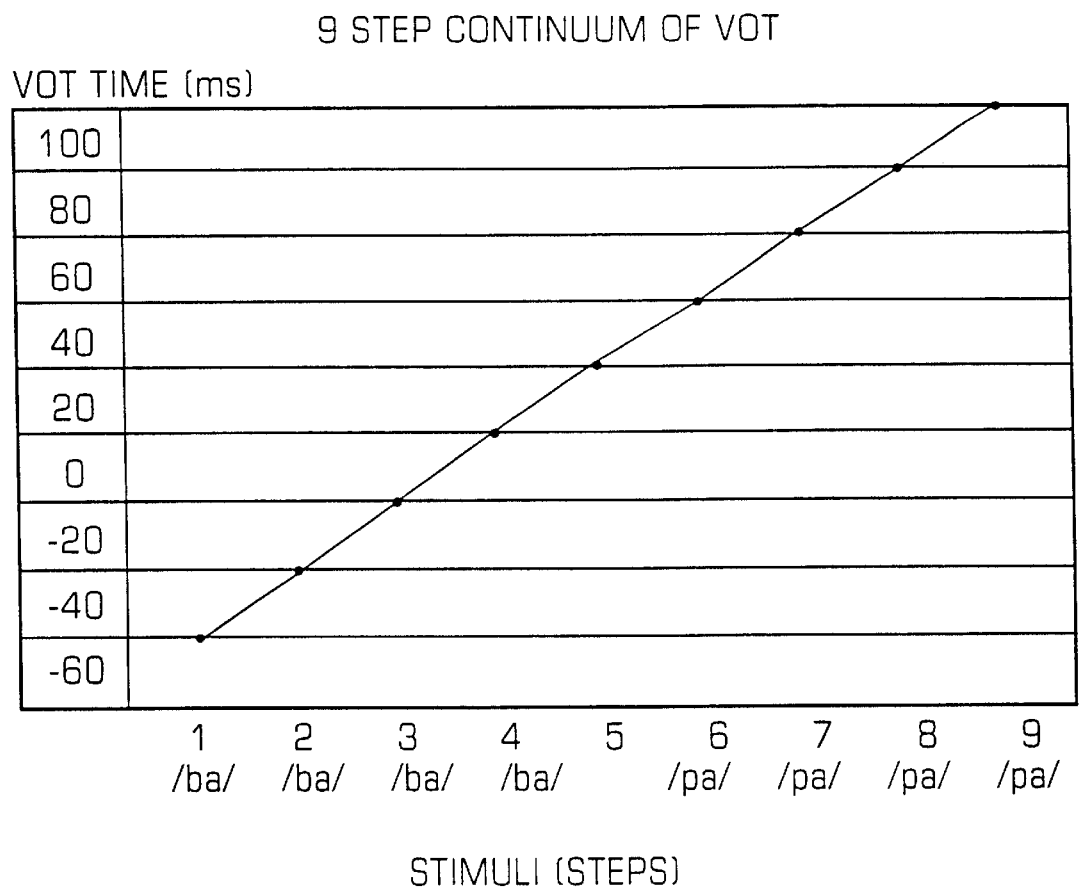
FIG. 11b is a diagram illustrating varying voice onset times (VOTs) in accordance with the invention.

FIG. 11b is a diagram illustrating an example of differing voice onset times (along the y-axis is milliseconds) for different stimuli (along x-axis). In this example, nine different voice onset times (steps) between /ba/ and /pa/ are shown although the number of steps may be varied in accordance with the invention. The voice onset time is defined as the amount of time between the onset of the consonant and the onset of voicing (i.e., the onset of the subsequent vowel). In this example of acoustic modification, the time acoustic component is being varied instead of the frequency acoustic component. Thus, in accordance with the invention, various acoustic components, such as frequency or time, may be modified in order to change the difficulty of distinguishing two different stimuli. Now, the various modules of the training tool in accordance with the invention will be described. In particular, the sound recall training module will now be described.

Figure 12:
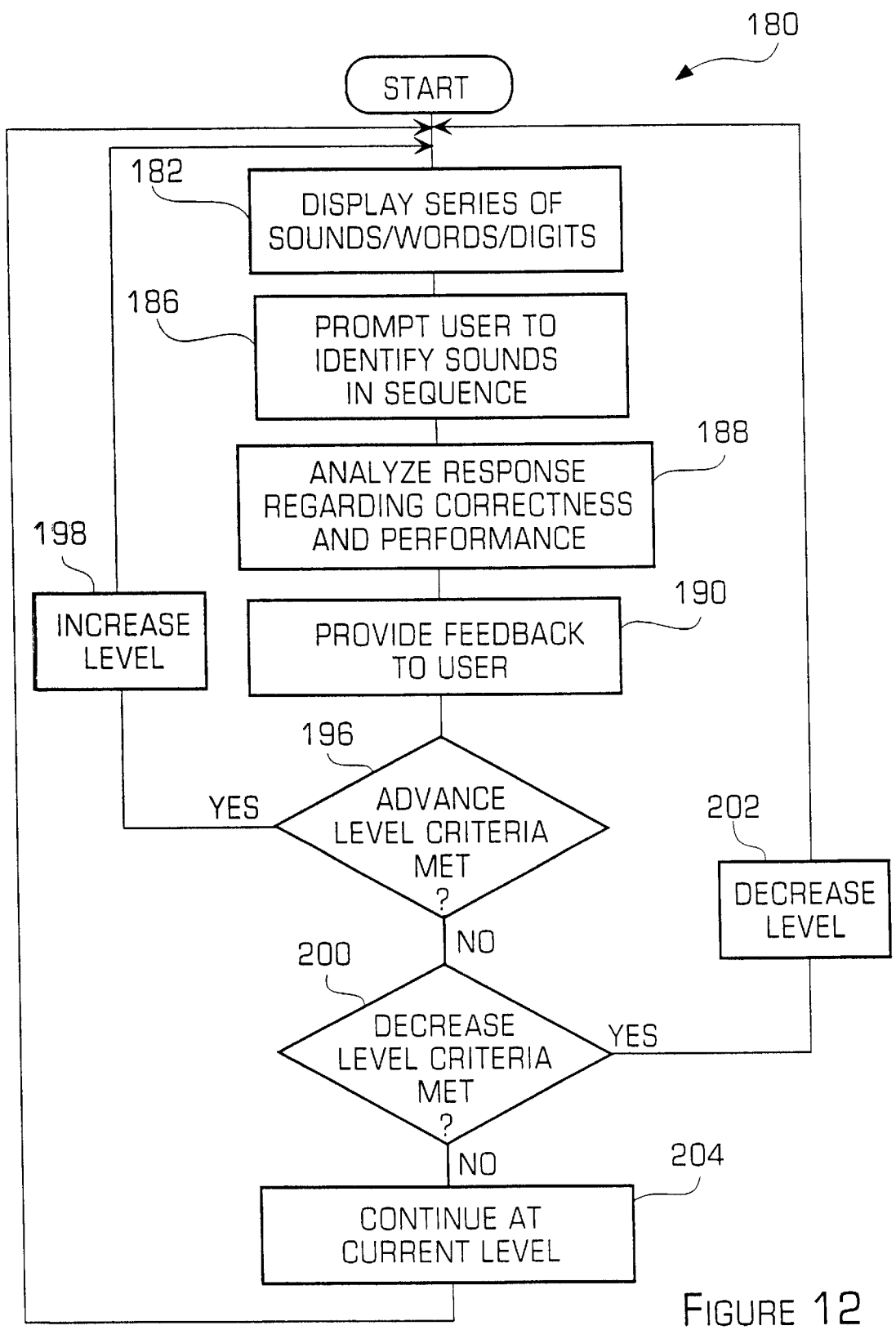
FIG. 12 is flowchart illustrating a method for training a recall skill in accordance with the invention.
Figure 13:
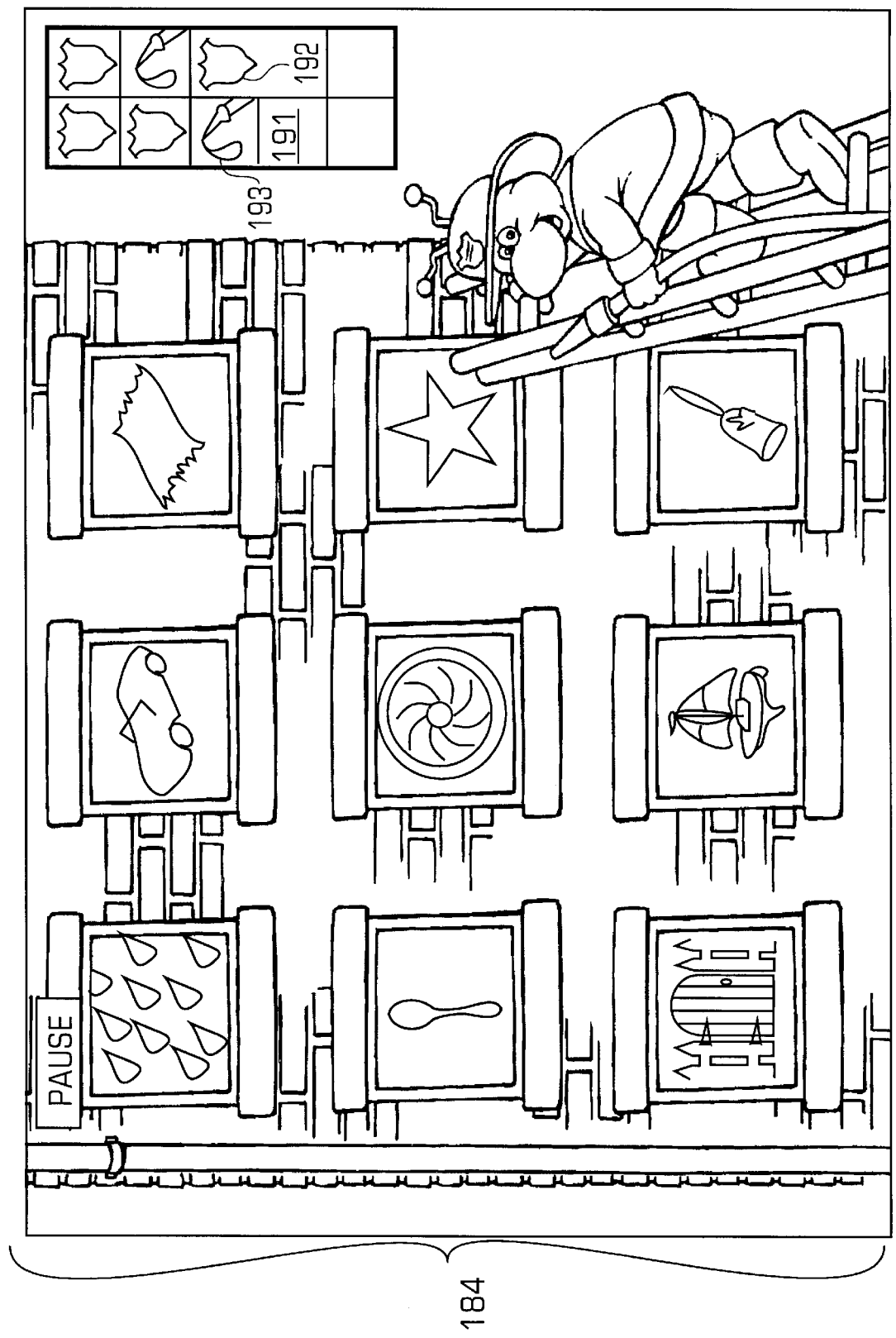
FIG. 13 is a diagram illustrating an example of the recall training game in accordance with the invention.
Figure 14:
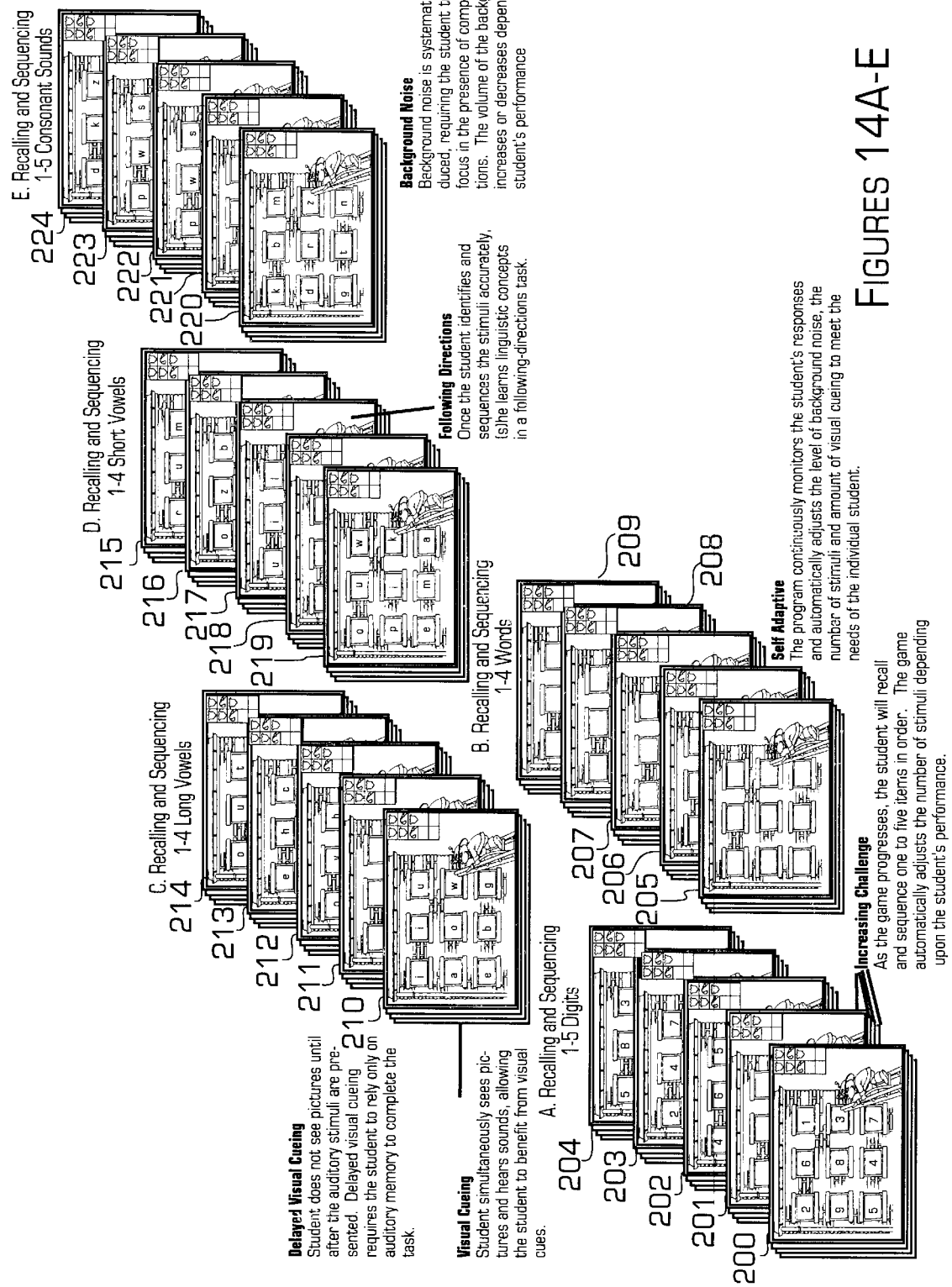
FIG. 14A–14E are diagrams illustrating examples of different views of the recall training game of FIG. 13.

FIG. 12 is flowchart illustrating a method 180 for training a sound recall skill of a user in accordance with the invention. Although the method is being described as a single task, the single task in accordance with the invention may actually include multiple smaller sub-tasks wherein each sub-task may train a particular area within the skills or may vary a different difficulty variable (as described below). In step 182, the training module may display visual representations of a series of sounds/words or digits 184 as shown in FIG. 13, generate written or oral instructions for the user and then generate a series of sounds with a time interval between each sound. In step 186, the user is prompted to identify the graphical representations of the sounds/words/digits generated by the computer in sequence. In step 188, the module analyzes the user's response to determine, for example, the correctness of the user's response and performance of the user based on some performance criteria such as time elapsed during the response. In step 190, the module may provide the user with feedback 191 (shown in FIG. 13 as visual feedback, but it may also be auditory feedback) about the user's responses. In the example of the visual feedback shown in FIG. 13, a shield 192 may indicate a correct response while a fire hose 193 may indicate an incorrect response. In this task, a 3/2 adaptive training system may be used in which the user may advance to a higher level (as described below) if the user has provided three prior consecutive correct responses and may be decreased to a lower level (as described below) if the user has provided two prior consecutive incorrect answers.

Thus, in step 196, the module may determine if the user has met the advance level criteria (e.g. has the user answered three prior consecutive questions correctly within a specified amount of time). If the user has met the advance level criteria, the module may increase the difficulty of the task in step 198. The difficulty of the task may be increased by changing one or more of a number of different difficulty variables in accordance with the invention. For example, the difficulty variables may include the number of sounds in the series, the types of sounds since some sounds are harder to distinguish than other sounds (e.g., long vowels are easier to distinguish than short vowels which are in turn easier to distinguish than consonants), the timing of the visual cueing (e.g., the visual cueing may occur at the time that the sound is generated or it may be delayed by some period of time making it hard to rely on the visual cue for help), the level of background noise (e.g., it is harder to distinguish sounds when there is more background noise) or the type of linguistic modifier including in the instructions to the user. The type of linguistic modifier may include, for example, "and", "not", "or", "first", "last", "middle", "before" and "after". For example, the task may ask the user to identify a sound after a certain sequence of sounds. After the level has been increased using one or more of the difficulty variables, the module may loop back to step 182 to train the user at the harder difficulty level.

If the user has not met the advance level criteria, the module may determine if the user has met the decrease level criteria (i.e., the difficulty of the task should be reduced. since the user has provided incorrect responses to two prior questions) in step 200. If the user has met the decrease level criteria and thus needs to have the difficulty of the task decreased, the module may decrease the level difficulty in step 202 by changing one or more of the above described difficulty variables and the method loops back to step 182 to train at the lower difficulty level. If the user has not met the decrease level criteria, then the method continues onto step 204 in which the task continues at the current difficulty level and loops back to step 182. In this manner, the user's recall skills are trained. Now, several examples of the sub-tasks in the recall training module will be described.

FIGS. 14A–14E are diagrams illustrating examples of different sub-tasks of the recall training game of FIG. 13. In particular, FIG. 14A illustrates the sub-tasks 200–204 of the recalling module with a user recalling and sequencing 1 digit up to 5 digits which is the most difficult. FIG. 14B illustrates one or more sub-tasks 205–209 for recalling and sequencing 1 word up to 4 words which is more difficult than recalling the digits. FIG. 14C illustrates one or more sub-tasks 210–214 for recalling and sequencing 1 to 4 long vowels which is more difficult than recalling the words. FIG. 14D illustrates examples of one or more sub-tasks 215–219 for recalling and sequencing 1 to 4 short vowels which are more difficult to recall than long vowels. FIG. 14E illustrates examples of one or more sub-tasks 220–224 for recalling and sequencing 1 to 5 consonant sounds which are the hardest sounds to recall. Thus, the difficulty of the recalling training module increases from FIG. 14A–14E.

In summary, the recall training game may include 168 different levels of plays which teach the user auditory sequential memory, phoneme and word discrimination, auditory figure-ground discrimination and comprehension of linguistic concepts. As described above, the training may be controlled by changing the difficulty variables. Now, a first task of the sound detection module will be described in more detail.

Figure 15:
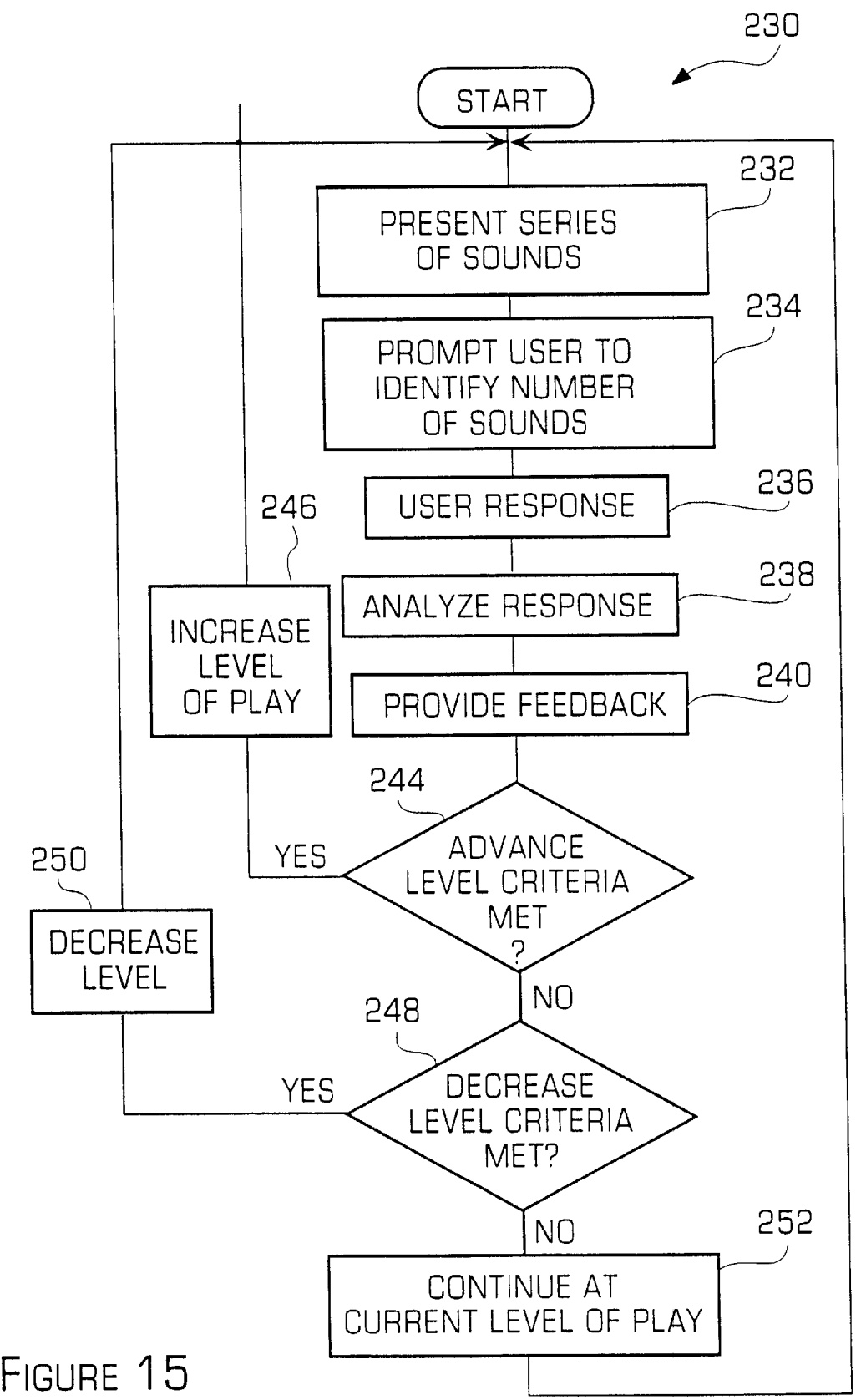
FIG. 15 is a diagram illustrating a first task of the sound unit identification training game in accordance with the invention.

FIG. 15 is a diagram illustrating a first task 230 of the sound unit detection training game in accordance with the invention. Although the method is being described as a single task, the single task in accordance with the invention may actually include multiple smaller sub-tasks wherein each sub-task may train a particular area within the skills or may vary a different difficulty variable (as described below). In step 232, the training module may audibly present a series of sounds to the user and generate written or oral instructions for the user for the particular task. In step 234, the user is prompted to identify the number of sounds heard by the user. In step 236, the user enters a response to the module using one of the input devices, such as the keyboard, the mouse or the speech recognition device. In step 238, the module analyzes the user's response to determine, for example, the correctness of the user's response and performance of the user based on some performance criteria such as time elapsed during the response. In step 240, the module may provide the user with feedback 242 (shown in FIG. 19 as visual feedback of a paint tube, but it may also be auditory feedback) about the user's responses. In the example of the visual feedback shown in FIG. 19, an empty paint tube may represent an incorrect answer and a paint tube squirting paint may indicate a correct response.

In step 244, the module may determine if the user has met the advance level criteria (e.g. has the user responded to a sufficient portion (e.g., 80%) of the presentations correctly within a sufficient amount of time). If the user has met the advance level criteria, the module may increase the difficulty of the task in step 246. The difficulty of the task may be increased by changing one or more of a number of different difficulty variables in accordance with the invention. For example, the difficulty variables may include the number of sounds in the series, a varying time interval between sounds or the availability of the auditory feedback provided to the user. After the level has been increased using one or more of the difficulty variables, the module may loop back to step 232 at the increased level.

If the user has not met the advance level criteria, the module may determine if the user has met the decrease level criteria (i.e., the difficulty of the task should be reduced since the user cannot adequately master the current level of the task since he/she answered less than 80% of the questions correctly) in step 248. If the user has met the decrease level criteria and thus needs to have the difficulty of the task decreased, the module may decrease the level difficulty in step 250 by changing one or more of the above described difficulty variables and the method loops back to step 232 to train at the lower difficulty level. If the user has not met the decrease level criteria, then the method continues onto step 252 in which the task continues at the current difficulty level and loops back to step 232.

Figure 16:
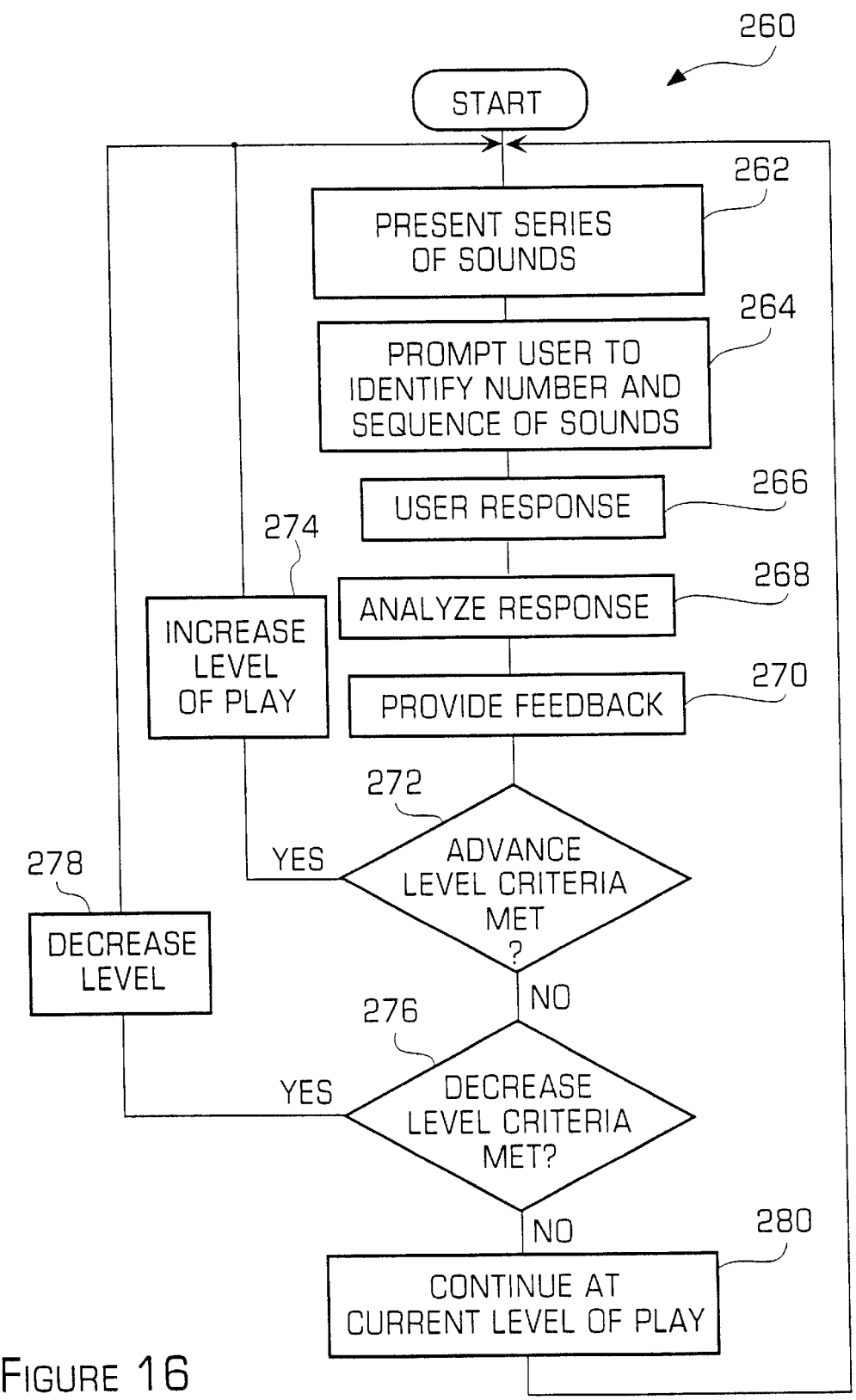
FIG. 16 is a diagram illustrating a second task of the sound unit identification training game in accordance with the invention.

FIG. 16 is a diagram illustrating a second task 260 of the sound unit detection training game in accordance with the invention. Although the method is being described as a single task, the single task in accordance with the invention may actually include multiple smaller sub-tasks wherein each sub-task may train a particular area within the skills or may vary a different difficulty variable (as described below). In step 262, the training module may audibly present a series of sounds to the user and generate written or oral instructions for the user for the particular task. In step 264, the user is prompted to identify the number and sequence of sounds heard by the user. In step 266, the user enters a response to the module using one of the input devices, such as the keyboard, the mouse or the speech recognition device. In step 268, the module analyzes the user's response to determine, for example, the correctness of the user's response and performance of the user based on some performance criteria such as time elapsed during the response. In step 270, the module may provide the user with feedback 242 (shown in FIG. 19 as visual feedback of a paint tube, but it may also be auditory feedback) about the user's responses. In the example of the visual feedback shown in FIG. 19, an empty paint tube may represent an incorrect answer and a paint tube squirting paint may indicate a correct response.

In step 272, the module may determine if the user has met the advance level criteria (e.g. has the user answered a sufficient portion (e.g., 80%) of the questions correctly within a sufficient amount of time). If the user has met the advance level criteria, the module may increase the difficulty of the task in step 274. The difficulty of the task may be increased by changing one or more of a number of different difficulty variables in accordance with the invention. For example, the difficulty variables may include the number of sounds in the series, a varying time interval between sounds or the availability of the auditory feedback provided to the user. After the level has been increased using one or more of the difficulty variables, the module may loop back to step 262.

If the user has not met the advance level criteria, the module may determine if the user has met the decrease level criteria (i.e., the difficulty of the task should be reduced since the user cannot adequately master the current level of the task since he/she answered less than 80% of the questions correctly) in step 276. If the user has met the decrease level criteria and thus needs to have the difficulty of the task decreased, the module may decrease the level difficulty in step 278 by changing one or more of the above described difficulty variables and the method loops back to step 262. If the user has not met the decrease level criteria, then the method continues onto step 280 in which the task continues at the current difficulty level and loops back to step 262. Now, a third task of the sound unit identification training module will be described.

Figure 17:
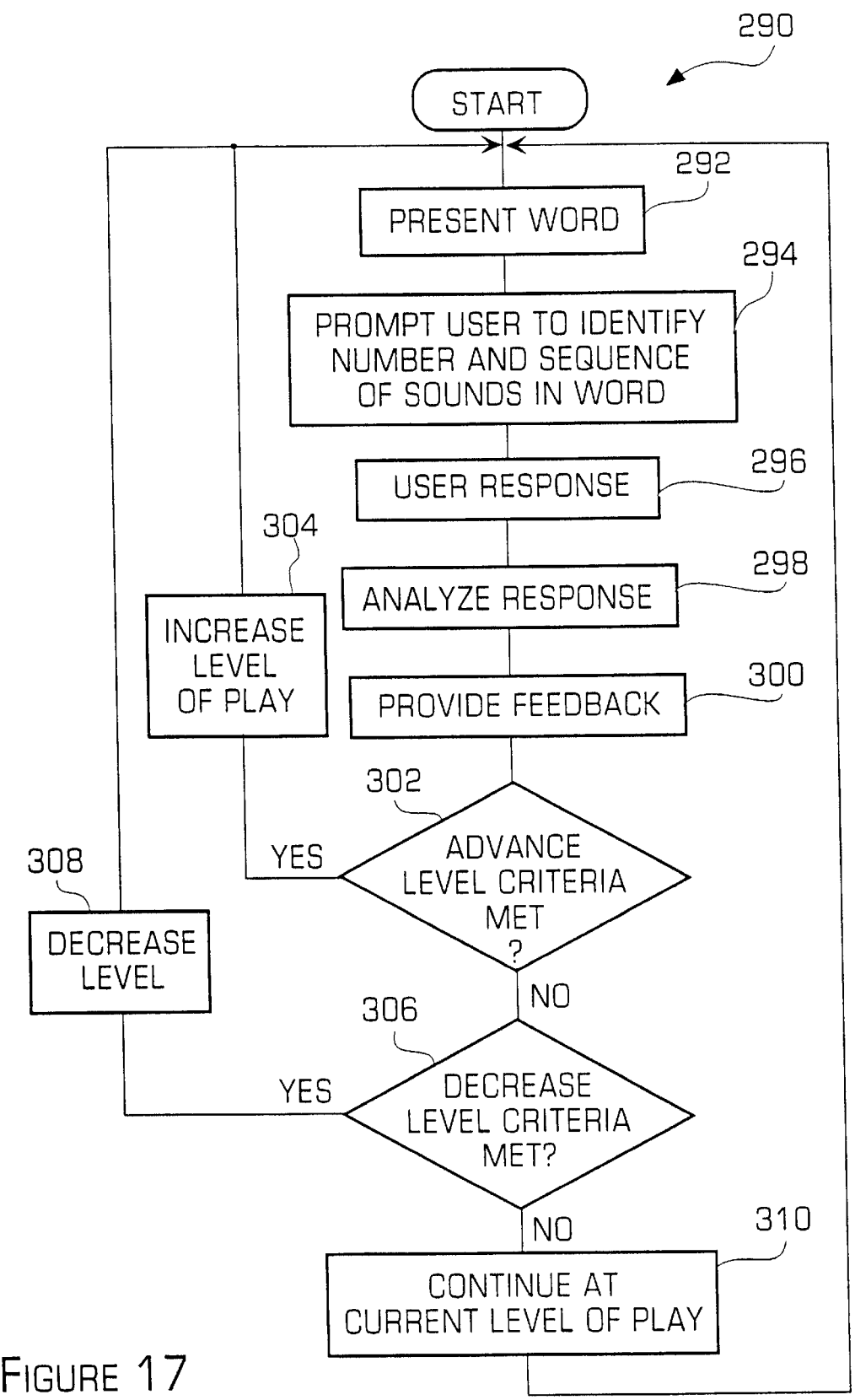
FIG. 17 is a diagram illustrating a third task of the sound unit identification training game in accordance with the invention.

FIG. 17 is a diagram illustrating a third task 290 of the sound unit detection training game in accordance with the invention. Although the method is being described as a single task, the single task in accordance with the invention may actually include multiple smaller sub-tasks wherein each sub-task may train a particular area within the skills or may vary a different difficulty variable (as described below). In step 292, the training module may audibly present a word to the user and generate written or oral instructions for the user for the particular task. In step 294, the user is prompted to identify the number and sequence of sounds (which may include either syllables or phonemes where syllables are more easily detected than phonemes) in the word heard by the user. For example, "cat" has three sound units. In step 296, the user enters a response to the module using one of the input devices, such as the keyboard, the mouse or the speech recognition device. In step 298, the module analyzes the user's response to determine, for example, the correctness of the user's response and performance of the user based on some performance criteria such as time elapsed during the response. In step 300, the module may provide the user with feedback 242 (shown in FIG. 19 as visual feedback of a paint tube, but it may also be auditory feedback) about the user's responses. In the example of the visual feedback shown in FIG. 19, an empty paint tube may represent an incorrect answer and a paint tube squirting paint may indicate a correct response.

In step 302, the module may determine if the user has met the advance level criteria (e.g. has the user answered a sufficient portion (e.g., 80%) of the questions correctly within a sufficient amount of time). If the user has met the advance level criteria, the module may increase the difficulty of the task in step 304. The difficulty of the task may be increased by changing one or more of a number of different difficulty variables in accordance with the invention. For example, the difficulty variables may include the number of sounds in the word, the availability of auditory feedback provided to the user, and the syllable structure of the word. The syllable structure of the word is the number and sequence of vowels (v) and consonants (c) in a word. For example, the word "on" has a syllable structure of "vc", the word "cat" has a syllable structure of "cvc" and "stop" has a syllable structure of "ccvc". In general, the easiest syllable structure is "vc" while the most difficult syllable structure is "cccvcc". In a preferred embodiment of the training tool, the syllable structures range from "vc" to "ccvc" or "cvcc". After the level has been increased using one or more of the difficulty variables, the module may loop back to step 292.

If the user has not met the advance level criteria, the module may determine if the user has met the decrease level criteria (i.e., the difficulty of the task should be reduced since the user cannot adequately master the current level of the task since he/she answered less than 80% of the questions correctly) in step 306. If the user has met the decrease level criteria and thus needs to have the difficulty of the task decreased, the module may decrease the level difficulty in step 308 by changing one or more of the above described difficulty variables and the method loops back to step 292. If the user has not met the decrease level criteria, then the method continues onto step 310 in which the task continues at the current difficulty level and loops back to step 292. Now, a fourth third task of the sound unit identification training module will be described.

Figure 18:
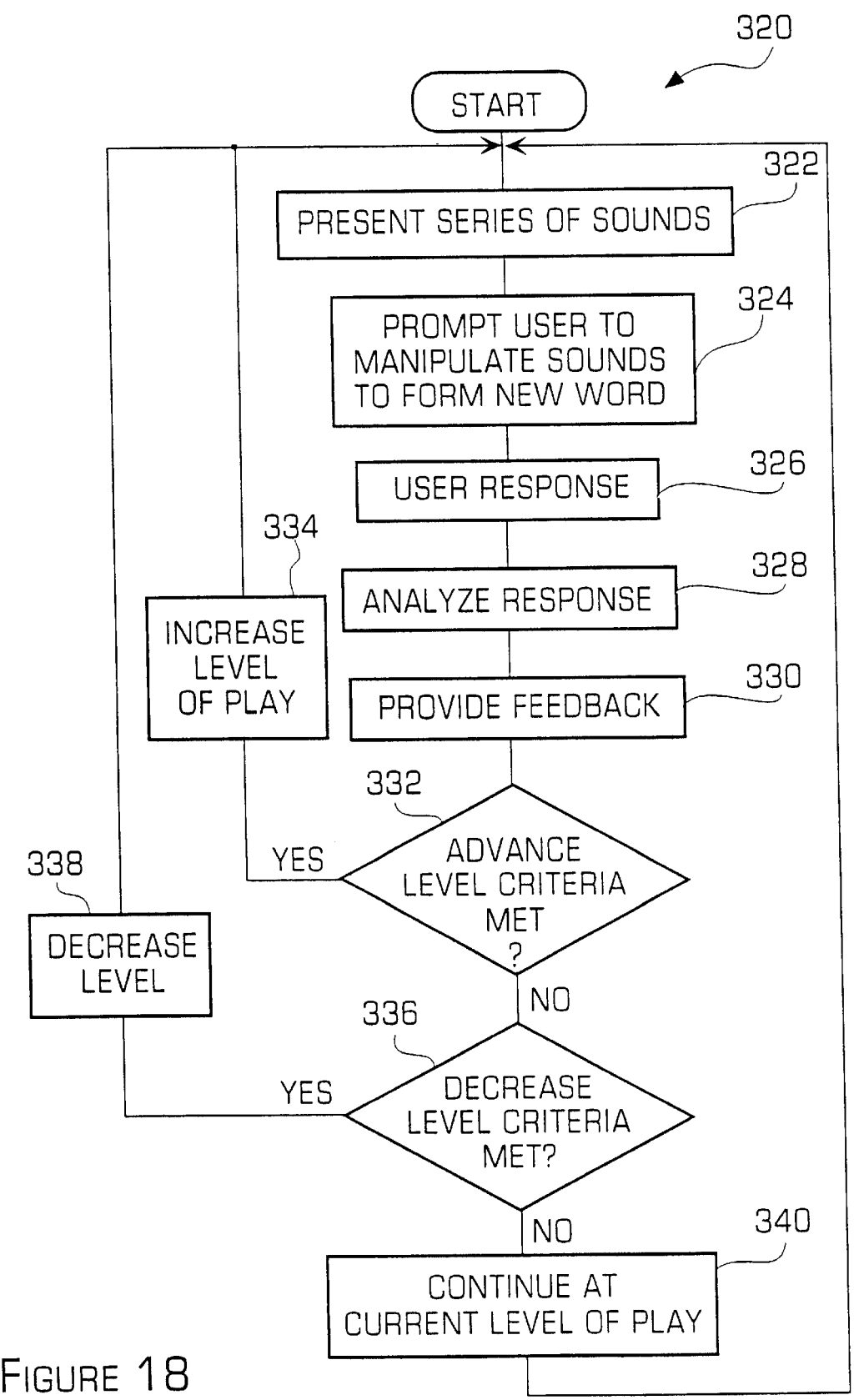
FIG. 18 is a diagram illustrating a fourth task of the sound unit identification training game in accordance with the invention.

FIG. 18 is a diagram illustrating a fourth task 320 of the sound unit detection training game in accordance with the invention. Although the method is being described as a single task, the single task in accordance with the invention may actually include multiple smaller sub-tasks wherein each sub-task may train a particular area within the skills or may vary a different difficulty variable (as described below). In step 322, the training module may audibly present a series of sounds to the user and generate written or oral instructions for the user for the particular task. In step 324, the user is prompted to manipulate the sounds to form a new word. For example, the user may be asked to use one or more phonemes to form a new word. In step 326, the user enters a response to the module using one of the input devices, such as the keyboard, the mouse or the speech recognition device. In step 328, the module analyzes the user's response to determine, for example, the correctness of the user's response and performance of the user based on some performance criteria such as time elapsed during the response. In step 330, the module may provide the user with feedback 242 (shown in FIG. 19 as visual feedback of a paint tube, but it may also be auditory feedback) about the user's responses. In the example of the visual feedback shown in FIG. 19, an empty paint tube may represent an incorrect answer and a paint tube squirting paint may indicate a correct response.

In step 332, the module may determine if the user has met the advance level criteria (e.g. has the user answered a sufficient portion (e.g., 80%) of the questions correctly within a sufficient amount of time). If the user has met the advance level criteria, the module may increase the difficulty of the task in step 334. The difficulty of the task may be increased by changing one or more of a number of different difficulty variables in accordance with the invention. For example, the difficulty variables may include the number of sounds in the series, the availability of the auditory feedback provided to the user, and the type of manipulation requested. For example, the user may be requested to manipulate a word by re-arranging phonemes, deleting a phoneme, replacing a phoneme, or inserting a phoneme which each have a different level of difficulty. After the level has been increased using one or more of the difficulty variables, the module may loop back to step 322.

If the user has not met the advance level criteria, the module may determine if the user has met the decrease level criteria (i.e., the difficulty of the task should be reduced since the user cannot adequately master the current level of the task since he/she answered less than 80% of the questions correctly) in step 336. If the user has met the decrease level criteria and thus need to have the difficulty of the task decreased, the module may decrease the level difficulty in step 338 by changing one or more of the above described difficulty variables and the method loops back to step 322. If the user has not met the decrease level criteria, then the method continues onto step 340 in which the task continues at the current difficulty level and loops back to step 322. Now, an example of the sound unit identification training module user interface will be described.

Figure 19:
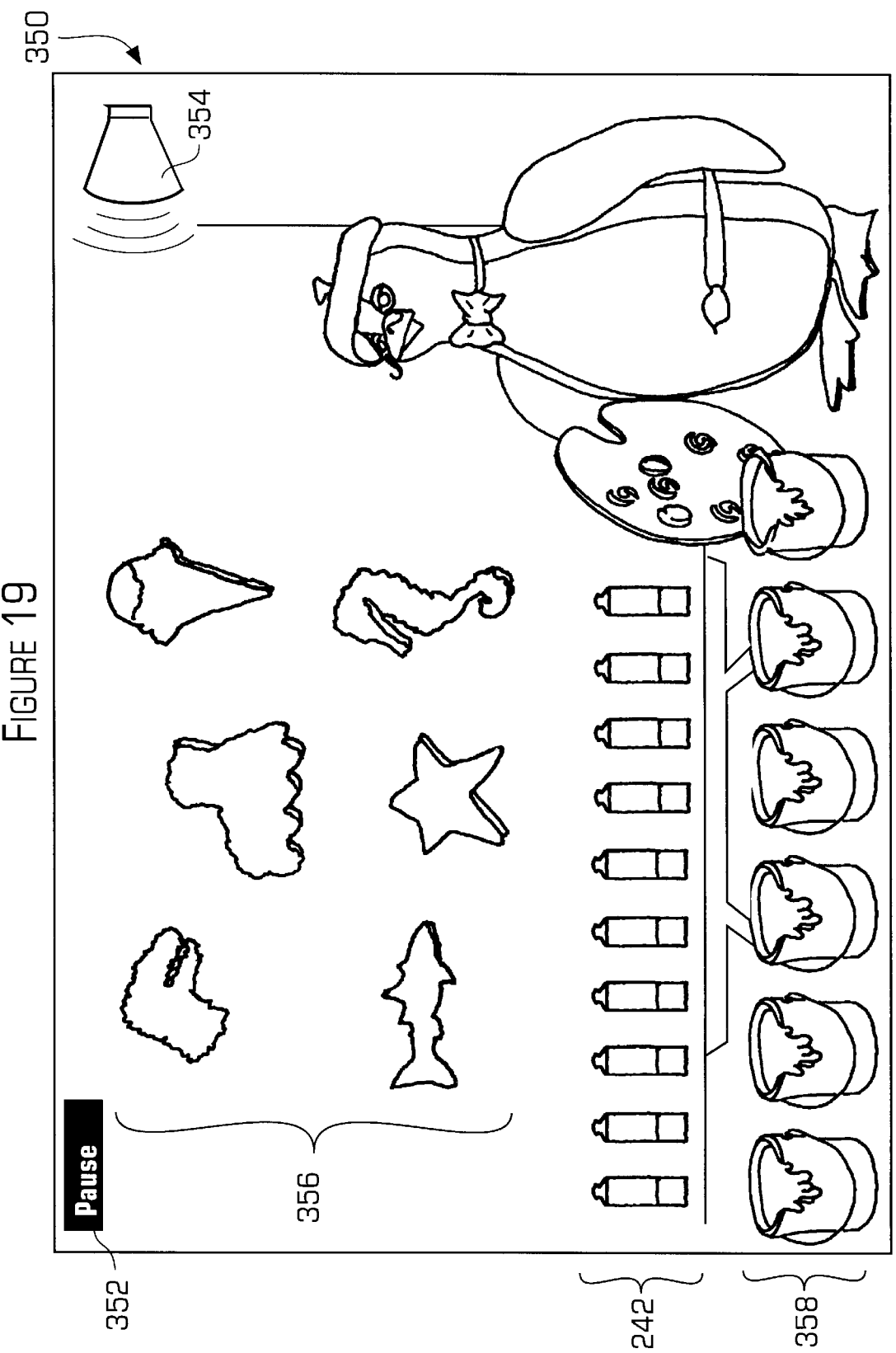
FIG. 19 is a diagram illustrating an example of the sound unit identification training game in accordance with the invention.
Figure 20:
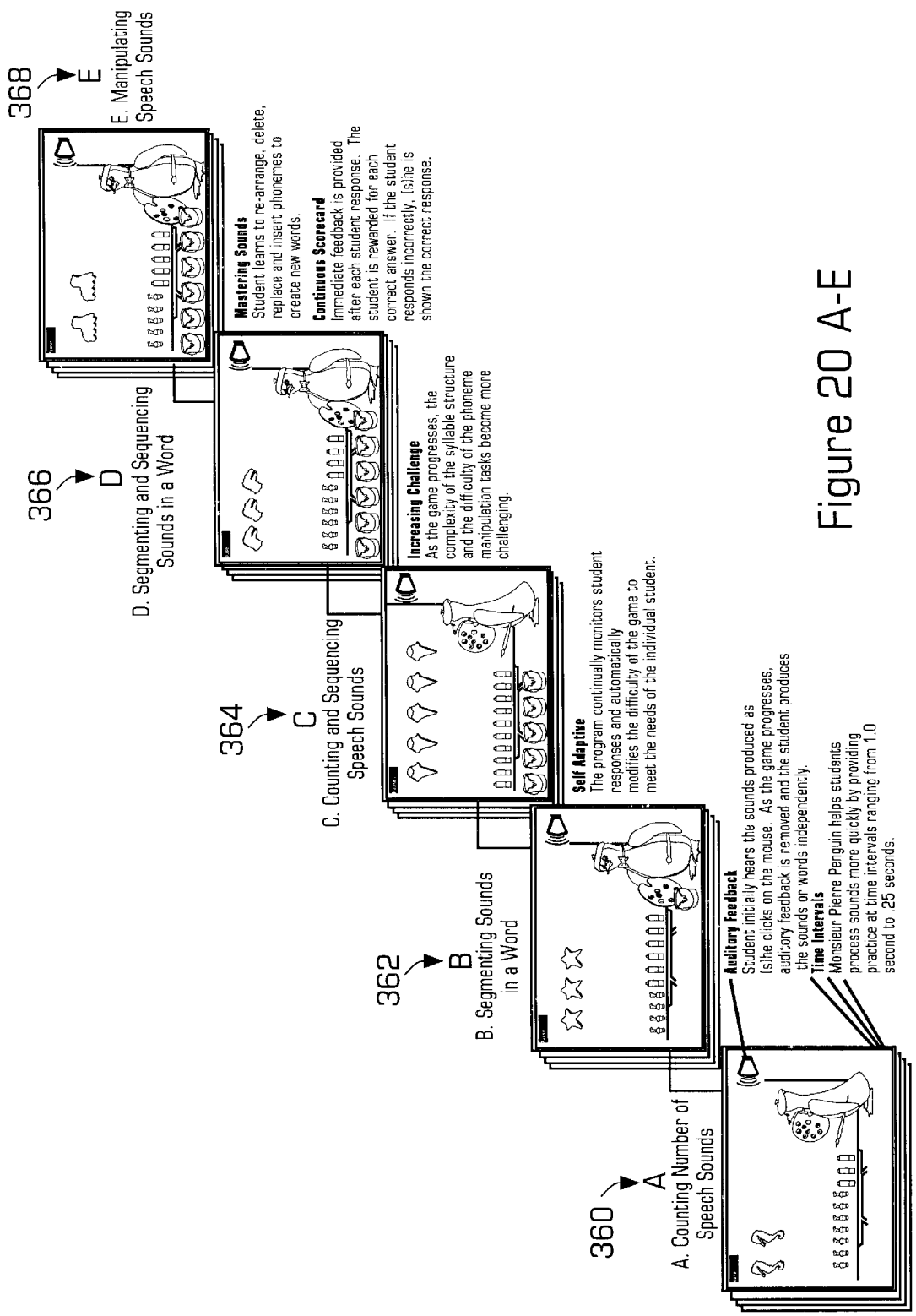
FIGS. 20A–20E are diagrams illustrating examples of different views of the sound unit identification training game of FIG. 19.

FIG. 19 is a diagram illustrating an example of the sound unit detection training game user interface 350 in accordance with the invention. The user interface may include the visual feedback 242 as described above, a pause button 352 to pause the game, a speaker icon 354 so that the user may request that the sound is replayed, one or more different colored sponge prints 356 each representing a click of the button by the user, and one or more different color paintcans 358. During the game, the user hears a word, such as "dog" and clicks on three different color paintcans indicating that the word has three different sounds. As the user clicks on the paintcans, one or more sponge prints may appear to provide the user with feedback about the number of clicks the user has made. Now, several example of the tasks of the sound unit detection module will be described.

FIGS. 20A–20E are diagrams illustrating examples of different views of the sound unit detection training game of FIG. 19. In particular, FIG. 20A illustrates a screen 360 in which the user is counting the number and sequence of speech sounds while FIG. 20B illustrates a screen 362 in which the user is segmenting sounds in a word. As illustrated, each sub-task may use the same user interface with changing stimulus. Thus, in FIG. 20C, a screen 364 is shown in which the user counts and sequences speech sounds, FIG. 20D shows a screen 366 in which the user segments and sequences sounds within a word, and FIG. 20E shows a screen 368 in which a user manipulates speech sounds to generate a new word.

In summary, the sound unit detection module may contain 68 different levels (in a preferred embodiment) which teaches a user to count and sequence sounds in a series of sounds or in words and to create new words by deleting, adding, substituting and rearranging sounds. As described above, the tasks in the game may be controlled and adjusted based on the difficulty variables at each level of training. Now, the tasks incorporated into a preferred embodiment of the blending sound training game in accordance with the invention will be described.

Figure 21:
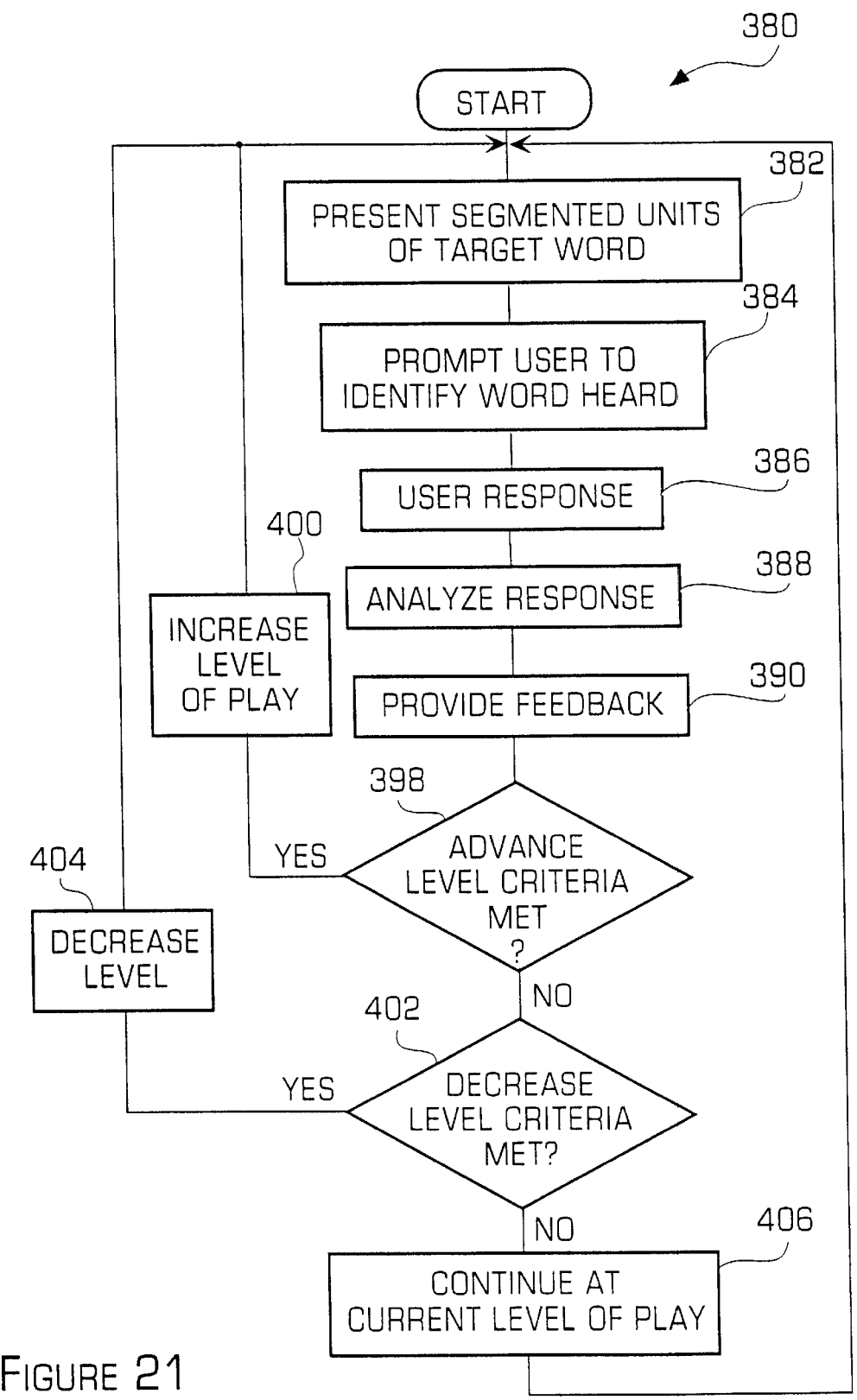
FIG. 21 is a flowchart illustrating a first task of the blending sounds training game in accordance with the invention.

FIG. 21 is a flowchart illustrating a first task 380 of the blending sounds training game in accordance with the invention. Although the method is being described as a single task, the single task in accordance with the invention may actually include multiple smaller sub-tasks wherein each sub-task may train a particular area within the skills or may vary a different difficulty variable (as described below). In step 382, the training module may audibly present the segmented sound units of a target word to the user and generate written or oral instructions for the user for the particular task. In step 384, the user is prompted to identify the word heard based on the segmented sound units. For example, the user may hear "di" "no" and "saur" separated from each other by a varying interval of time and the proper response should be "dinosaur". In step 386, the user enters a response to the module using one of the input devices, such as the keyboard, the mouse or the speech recognition device. In step 388, the module analyzes the user's response to determine, for example, the correctness of the user's response and performance of the user based on some performance criteria such as time elapsed during the response. In step 390, the module may provide the user with feedback 392 (shown in FIG. 23 as visual feedback, but it may also be auditory feedback) about the users responses. In the example of the visual feedback shown in FIG. 23, a gem 394 may indicate a correct answer and a coconut 396 may indicate an incorrect response.

In step 398, the module may determine if the user has met the advance level criteria (e.g. has the user answered three questions in a row correctly). In this task, a 3/2 adaptive training system may be used in which the user must provide three correct responses in a row to advance to the next level and if the user provides two incorrect responses in a row, the user's level is decreased. If the user has met the advance level criteria, the module may increase the difficulty of the task in step 400. The difficulty of the task may be increased by changing one or more of a number of different difficulty variables in accordance with the invention. For example, the difficulty variables may include the size of the sounds units since smaller sound units (e.g, speech sounds) are harder to put together than are larger sounds units (e.g., syllables), the time between the sounds units, the number of perceptually similar response choices, the number of units of sound or the syllable structure of the target word (as described above). After the level has been increased using one or more of the difficulty variables, the module may loop back to step 382.

If the user has not met the advance level criteria, the module may determine if the user has met the decrease level criteria (i.e., the user has provided two incorrect answers in a row) in step 402. If the user has met the decrease level criteria and thus. need to have the difficulty of the task decreased, the module may decrease the level difficulty in step 404 by changing one or more of the above described difficulty variables and the method loops back to step 382. If the user has not met the decrease level criteria, then the method continues onto step 406 in which the task continues at the current difficulty level and loops back to step 382.

Now, a second task of the blending sounds training game will be described.

Figure 22:
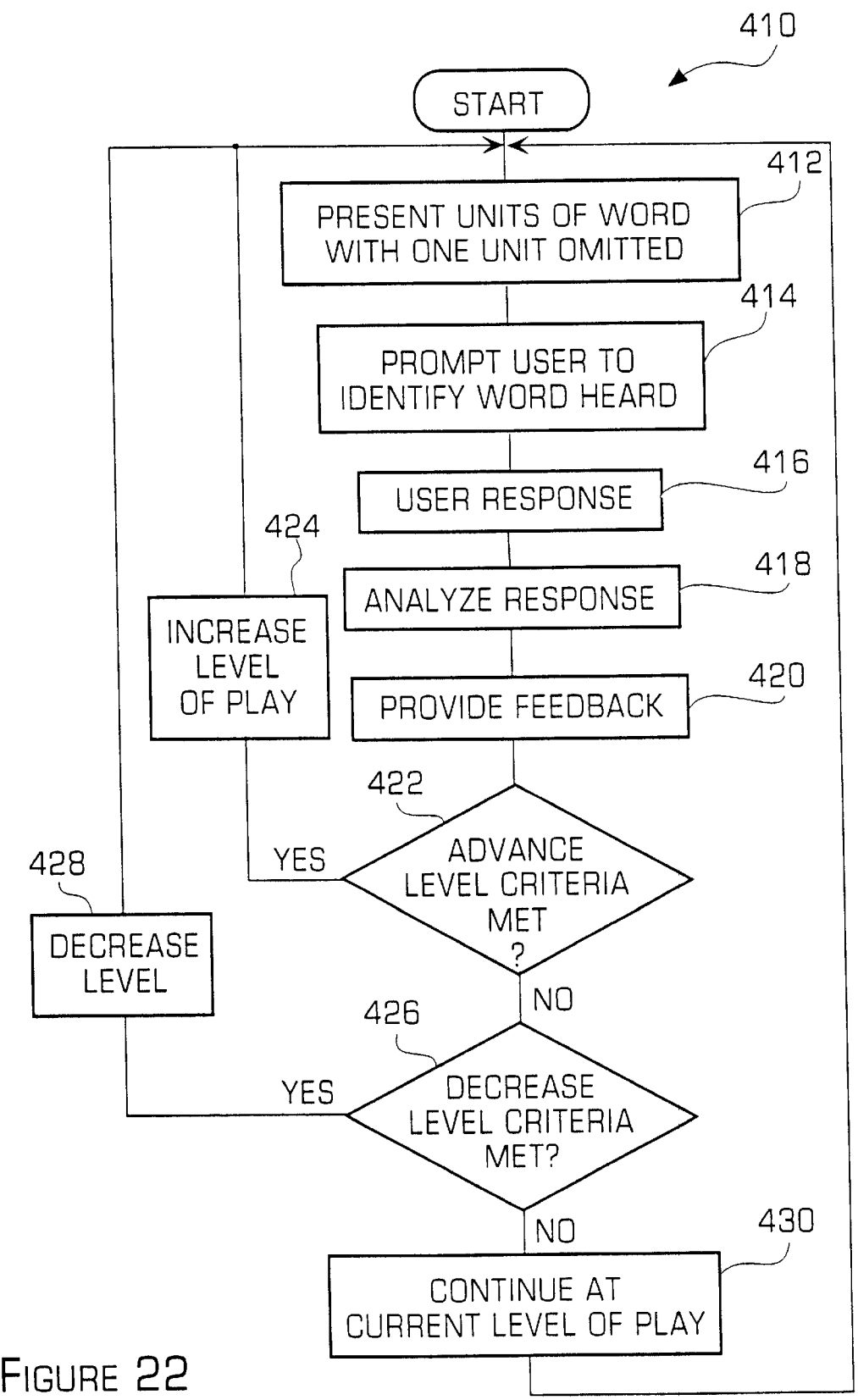
FIG. 22 is a flowchart illustrating a second task of the blending sounds training game in accordance with the invention.

FIG. 22 is a flowchart illustrating a second task 410 of the blending sounds training game in accordance with the invention. Although the method is being described as a single task, the single task in accordance with the invention may actually include multiple smaller sub-tasks wherein each sub-task may train a particular area within the skills or may vary a different difficulty variable (as described below). In step 412, the training module may audibly present sound units of a word with one unit omitted (e.g., /c/ and /t/ for "cat") and generate written or oral instructions for the user for the particular task. In step 414, the user is prompted to identify the word heard based on the sound units heard combined with the omitted sound unit. For example, the user may hear /c/ and /a/ and the proper response should be "cat". In step 416, the user enters a response to the module using one of the input devices, such as the keyboard, the mouse or the speech recognition device. In step 418, the module analyzes the user's response to determine, for example, the correctness of the user's response and performance of the user based on some performance criteria such as time elapsed during the response. In step 420, the module may provide the user with feedback 392 (shown in FIG. 23 as visual feedback, but it may also be auditory feedback) about the user's responses. In the example of the visual feedback shown in FIG. 23, a gem 394 may indicate a correct answer and a coconut 396 may indicate an incorrect response.

In step 422, the module may determine if the user has met the advance level criteria (e.g. has the user answered three questions in a row correctly). In this task, a 3/2 adaptive training system may be used in which the user must provide three correct responses in a row to advance to the next level and if the user provides two incorrect responses in a row, the user's level is decreased. If the user has met the advance level criteria, the module may increase the difficulty of the task in step 424. The difficulty of the task may be increased by changing one or more of a number of different difficulty variables in accordance with the invention. For example, the difficulty variables may include the size of the sounds units since smaller sound units are harder to put together than are larger sound units, the number of sounds units in the word, the syllable structure of the target word (as described above), or the position in the word of the omitted sound (e.g., it is harder to guess when the omitted sound is at the start of the word than if the omitted sounds is at the end of the word). The position of the omitted sound in the word may be the initial sound, a medial sound or the ending sound. After the level has been increased using one or more of the difficulty variables, the module may loop back to step 412.

If the user has not met the advance level criteria, the module may determine if the user has met the decrease level criteria (i.e., the user has provided two incorrect answers in a row) in step 426. If the user has met the decrease level criteria and thus need to have the difficulty of the task decreased, the module may decrease the level difficulty in step 428 by changing one or more of the above described difficulty variables and the method loops back to step 412. If the user has not met the decrease level criteria, then the method continues onto step 430 in which the task continues at the current difficulty level and loops back to step 412. Now, an example of the user interface for the blending sounds training module will be described.

Figure 23:
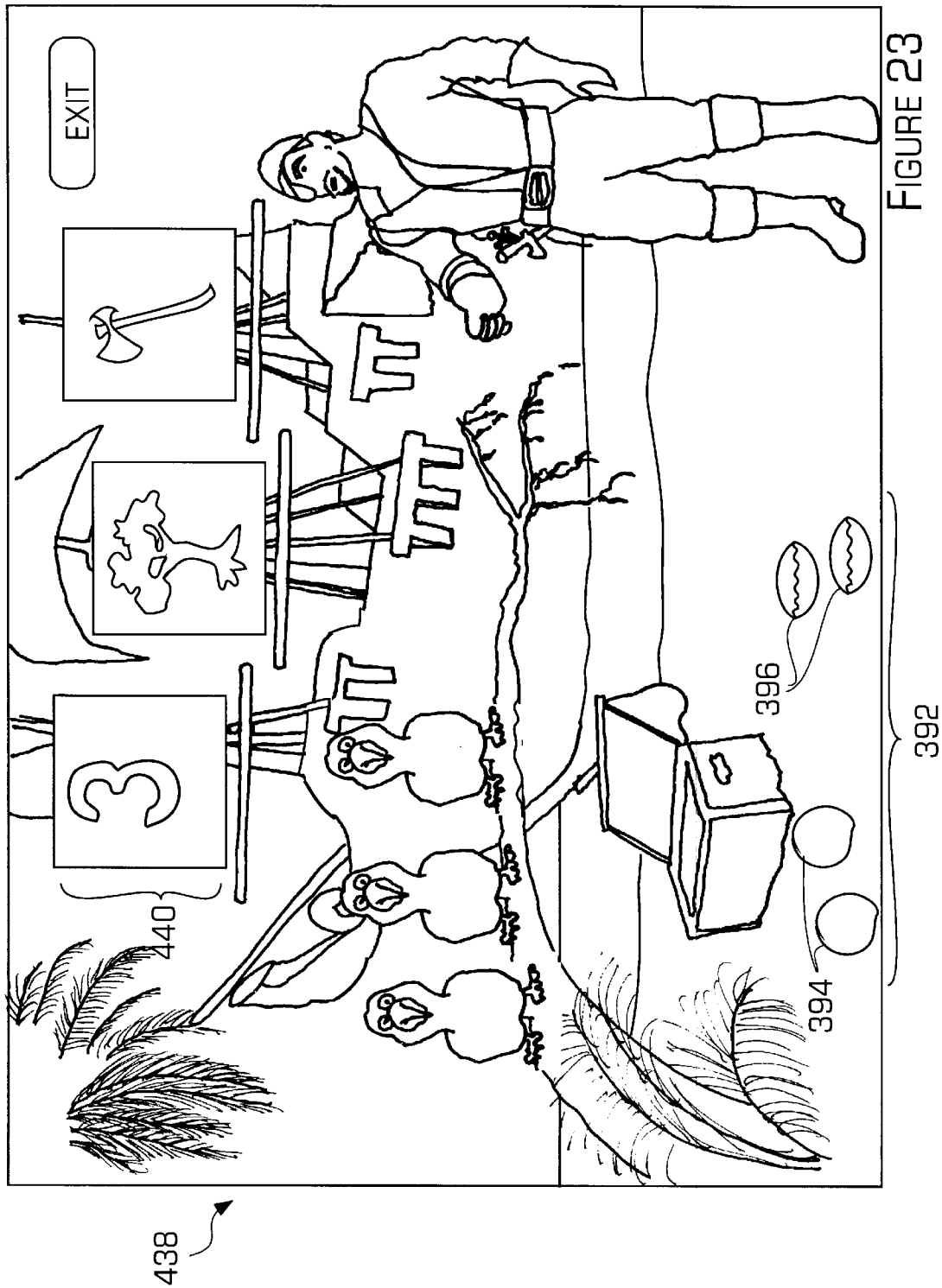
FIG. 23 is a diagram illustrating an example of the blending sounds training game in accordance with the invention.
Figure 24:
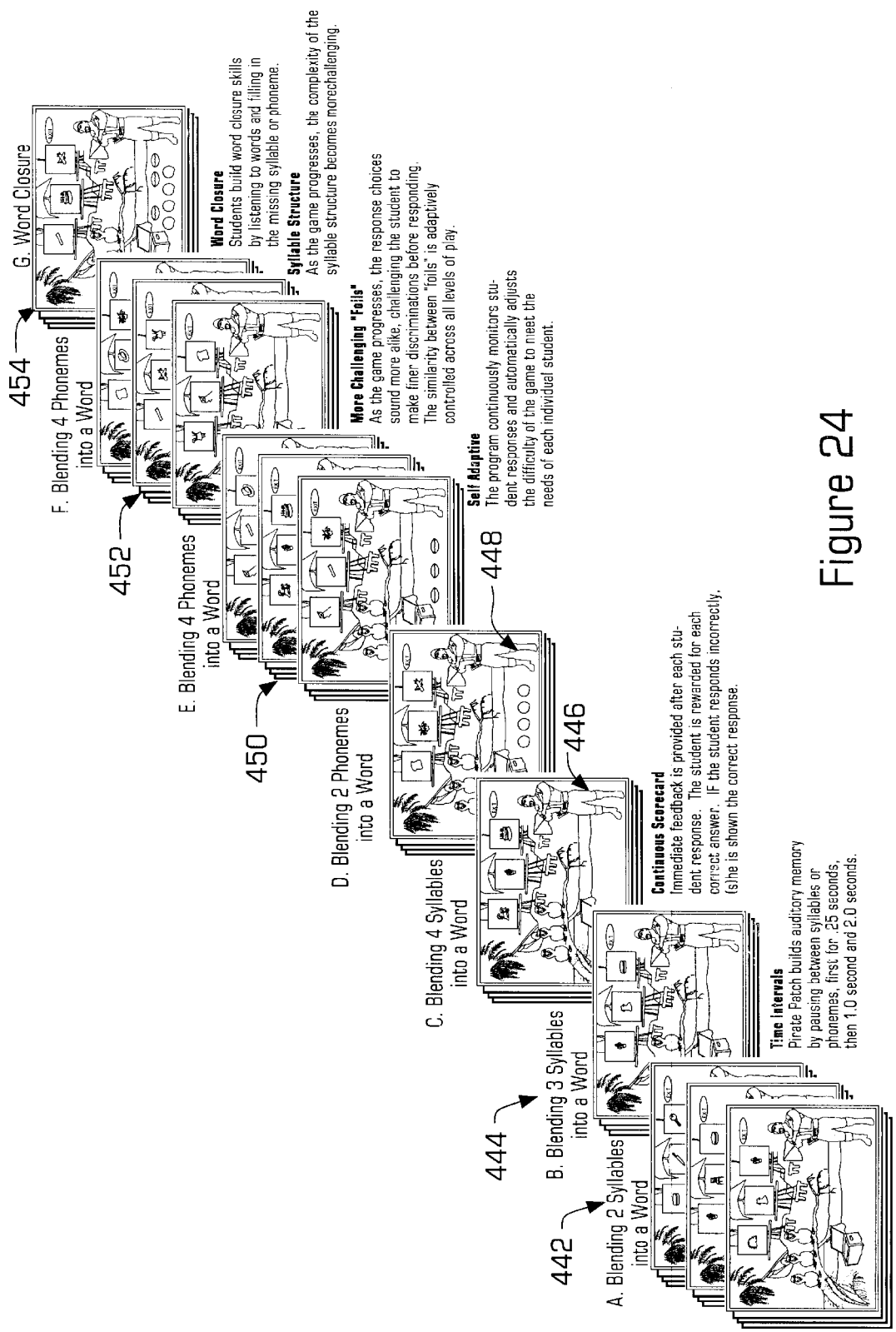
FIG. 24A–24G are diagrams illustrating examples of different views of the blending sounds training game of FIG. 23.

FIG. 23 is a diagram illustrating an example of a user interface 438 of the sound blending training game in accordance with the invention that may include the feedback 392 and one or more graphical representations 440 of words. In operation, the user may hear the sounds /t/, /r/ and /ee/ separately (or with one sound unit omitted) and then blend the sounds together to form the word "tree" and then click the appropriate picture 440 of the tree. FIGS. 24A–24G are diagrams illustrating examples of different views of sub-tasks of the blending sounds training game of FIG. 23. In particular, each sub-task may use the same user interface, but will train different skills as described above. Thus, as described in ascending order of difficulty, a sub-task 442 (shown in FIG. 24A) trains a user's skill at blending two syllables into a word, a sub-task 444 (as shown in FIG. 24B) trains a user's skills at blending three syllables into a word, a subtask 446 (FIG. 24C) trains a user's skill at blending four syllables into a word, a sub-task 448 trains a user's skill at blending two phonemes into a word, a sub-task 450 trains a user's skill at blending three phonemes into a word, a sub-task 452 trains a user's skill at blending four phonemes into a word, and a sub-task 454 trains a user's skill at word closure (e.g., a user fills in missing syllables or phonemes into a word).

In summary, the blending sounds training game may include 60 different levels which train a user to blend syllables and phonemes into words. Once the blending has been mastered, the user may be trained to complete words by filling in missing syllables or phonemes. As described above, the difficulty of the training may be adjusted adaptively by changing one or more difficulty variables. Now, the tasks in a preferred embodiment of a sound identification training module will be described in more detail.

Figure 25:
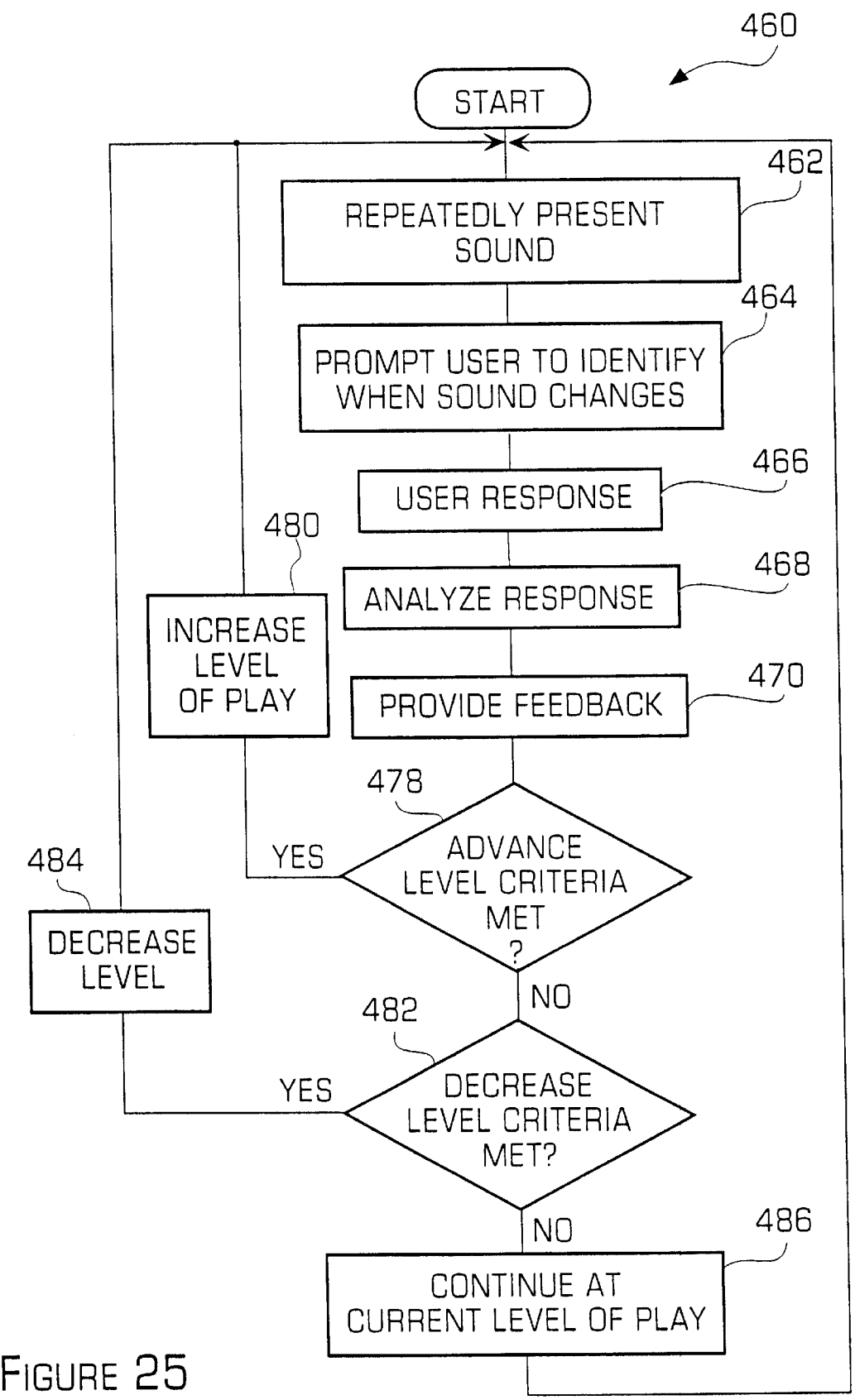
FIG. 25 is a diagram illustrating a first task of the sound identification training game in accordance with the invention.

FIG. 25 is a diagram illustrating a first task 460 of the sound identification training game in accordance with the invention. Although the method is being described as a single task, the single task in accordance with the invention may actually include multiple smaller sub-tasks wherein each sub-task may train a particular area within the skills or may vary a different difficulty variable (as described below). In step 462, the training module may audibly present a sound repeatedly to the user and generate written or oral instructions for the user for the particular task. In step 464, the user is prompted to identify when the sound changes. For example, the module may generate one or more acoustically modified sounds as described above, such as frequency changes and voice onset time changes. In step 466, the user enters a response to the module using one of the input devices, such as the keyboard, the mouse or the speech recognition device. In step 468, the module analyzes the user's response to determine, for example, the correctness of the user's response and performance of the user based on some performance criteria such as time elapsed during the response. In step 470, the module may provide the user with feedback 472 (shown in FIG. 29 as visual feedback, but it may also be auditory feedback) about the user's responses. In the example of the visual feedback shown in FIG. 29, a hippo score 474 may indicate a correct answer and a rhino score 476 may indicate an incorrect response.

In step 478, the module may determine if the user has met the advance level criteria (e.g. has the user answered three questions in a row correctly). In this task, a 3/2 adaptive training system may be used in which the user must provide three correct responses in a row to advance to the next level and if the user provides two incorrect responses in a row, the user's level is decreased. If the user has met the advance level criteria, the module may increase the difficulty of the task in step 480. The difficulty of the task may be increased by changing one or more of a number of different difficulty variables in accordance with the invention. For example, the difficulty variables may include the type of sound (vowel, consonant, etc.), the acoustic and perceptual differences between the sounds (which may be modified by the acoustic modifier as described above such as the differences in the frequency components and duration of the voice onset time), the phonetic context, and perceptual saliency of the sound.

The phonetic context refers to the neighboring, adjacent speech sounds, either before or after the target sound. Because of the way that sounds are co-articulated in connected speech, adjacent sounds affect the acoustic properties of the target sound and thereby affect its perceptual saliency and the level of perceptual difficulty. Some phonetic contexts have greater impact than others. For example, the /r/ and /l/ have a significant impact on the preceding vowel. In this context, the acoustic properties of the vowel are, in essence, distorted making this context more difficult that perceiving a vowel in isolation or in a different phonetic context, such as when it is followed by /t/. The acoustic and perceptual saliency refers to the inherent acoustic properties of sounds. Some sounds inherently have robust acoustic properties (energy, frequency and duration) making them relatively easy to perceive. Other sounds have weak acoustic cues which make them more difficult to perceive. For example, long vowels have more acoustic energy than short vowels and so are more salient. As another example, the consonants r-l (known as liquid consonants) are longer in duration than the consonants d-g (known as stop consonants) and therefore are more easily perceived. As a final example, the liquid consonants, r-l, have their acoustic energy distributed across a wide frequency range in comparison to the consonants m-n (known as nasal consonants), which have their acoustic energy concentrated in the low frequency range, thus making m-n less perceptually salient. After the level has been increased using one or more of the difficulty variables, the module may loop back to step 462.

If the user has not met the advance level criteria, the module may determine if the user has met the decrease level criteria (i.e., the user has provided two incorrect answers in a row) in step 482. If the user has met the decrease level criteria and thus need to have the difficulty of the task decreased, the module may decrease the level difficulty in step 484 by changing one or more of the above described difficulty variables and the method loops back to step 462. If the user has not met the decrease level criteria, then the method continues onto step 486 in which the task continues at the current difficulty level and loops back to step 462. Now, a second task of the sound identification module will be described.

Figure 26:
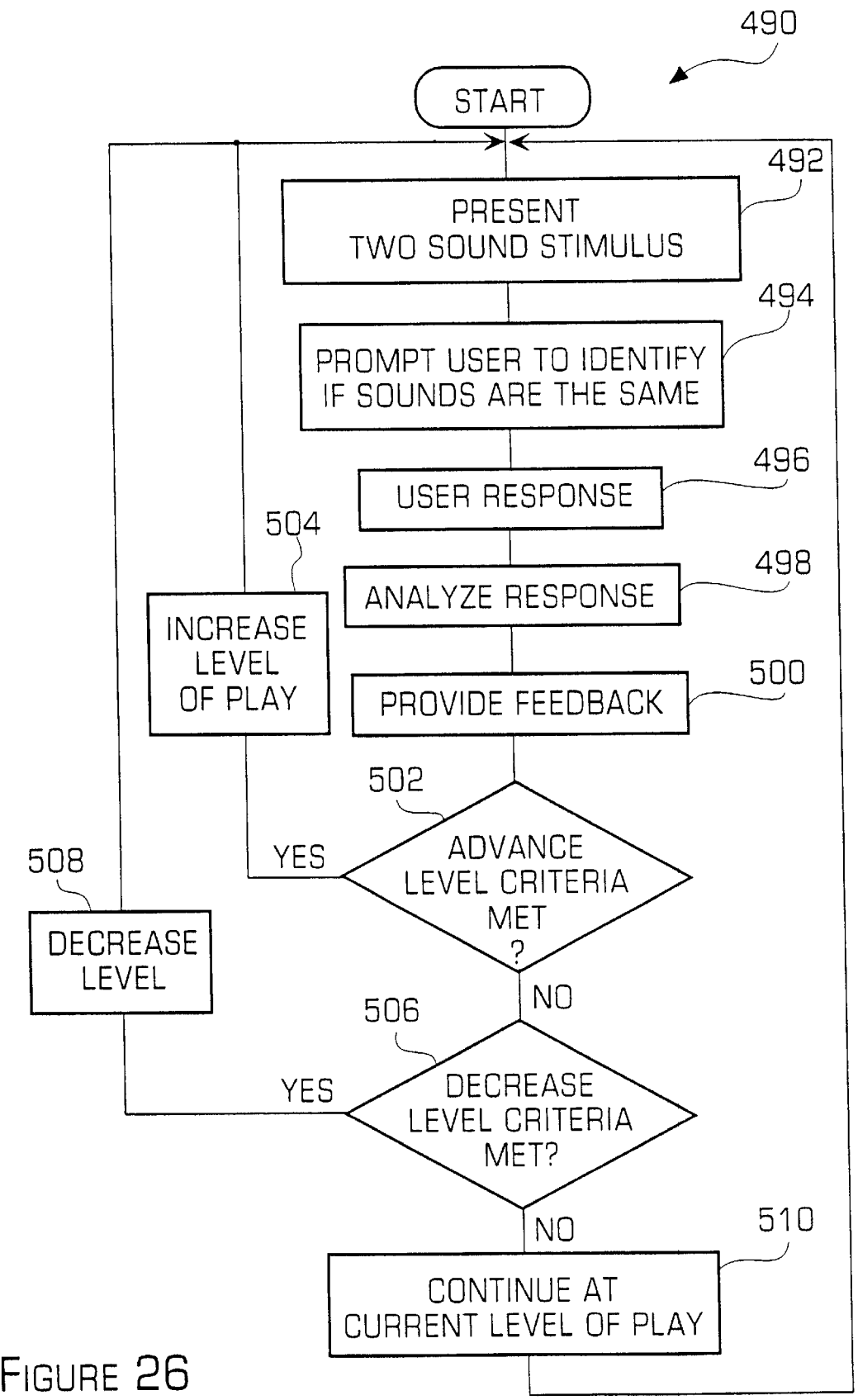
FIG. 26 is a diagram illustrating a second task of the sound identification training game in accordance with the invention.

FIG. 26 is a diagram illustrating a second task 490 of the sound identification training game in accordance with the invention. Although the method is being described as a single task, the single task in accordance with the invention may actually include multiple smaller sub-tasks wherein each sub-task may train a particular area within the skills or may vary a different difficulty variable (as described below). In step 492, the training module may audibly present two sound stimuli to the user and generate written or oral instructions for the user for the particular task. In step 494, the user is prompted to identify if the sounds are the same or different. In step 496, the user enters a response to the module using one of the input devices, such as the keyboard, the mouse or the speech recognition device. In step 498, the module analyzes the user's response to determine, for example, the correctness of the user's response and performance of the user based on some performance criteria such as time elapsed during the response. In step 500, the module may provide the user with feedback 472 (shown in FIG. 29 as visual feedback, but it may also be auditory feedback) about the user's responses. In the example of the visual feedback shown in FIG. 29, a hippo score 474 may indicate a correct answer and a rhino score 476 may indicate an incorrect response.

In step 502, the module may determine if the user has met the advance level criteria (e.g. has the user answered three questions in a row correctly). In this task, a 3/2 adaptive training system may be used in which the user must provide three correct responses in a row to advance to the next level and if the user provides two incorrect responses in a row, the user's level is decreased. If the user has met the advance level criteria, the module may increase the difficulty of the task in step 504. The difficulty of the task may be increased by changing one or more of a If number of different difficulty variables in accordance with the invention. For example, the difficulty variables may include the acoustic and perceptual differences between the sounds (which may be modified by the acoustic modifier as described above), and the inherent acoustic and perceptual saliency of the sound as described above. After the level has been increased using one or more of the difficulty variables, the module may loop back to step 492.

If the user has not met the advance level criteria, the module may determine if the user has met the decrease level criteria (i.e., the user has provided two incorrect answers in a row) in step 506. If the user has met the decrease level criteria and thus need to have the difficulty of the task decreased, the module may decrease the level difficulty in step 508 by changing one or more of the above described difficulty variables and the method loops back to step 492. If the user has not met the decrease level criteria, then the method continues onto step 510 in which the task continues at the current difficulty level and loops back to step 492. Now, a third task of the sound identification module will be described.

Figure 27:
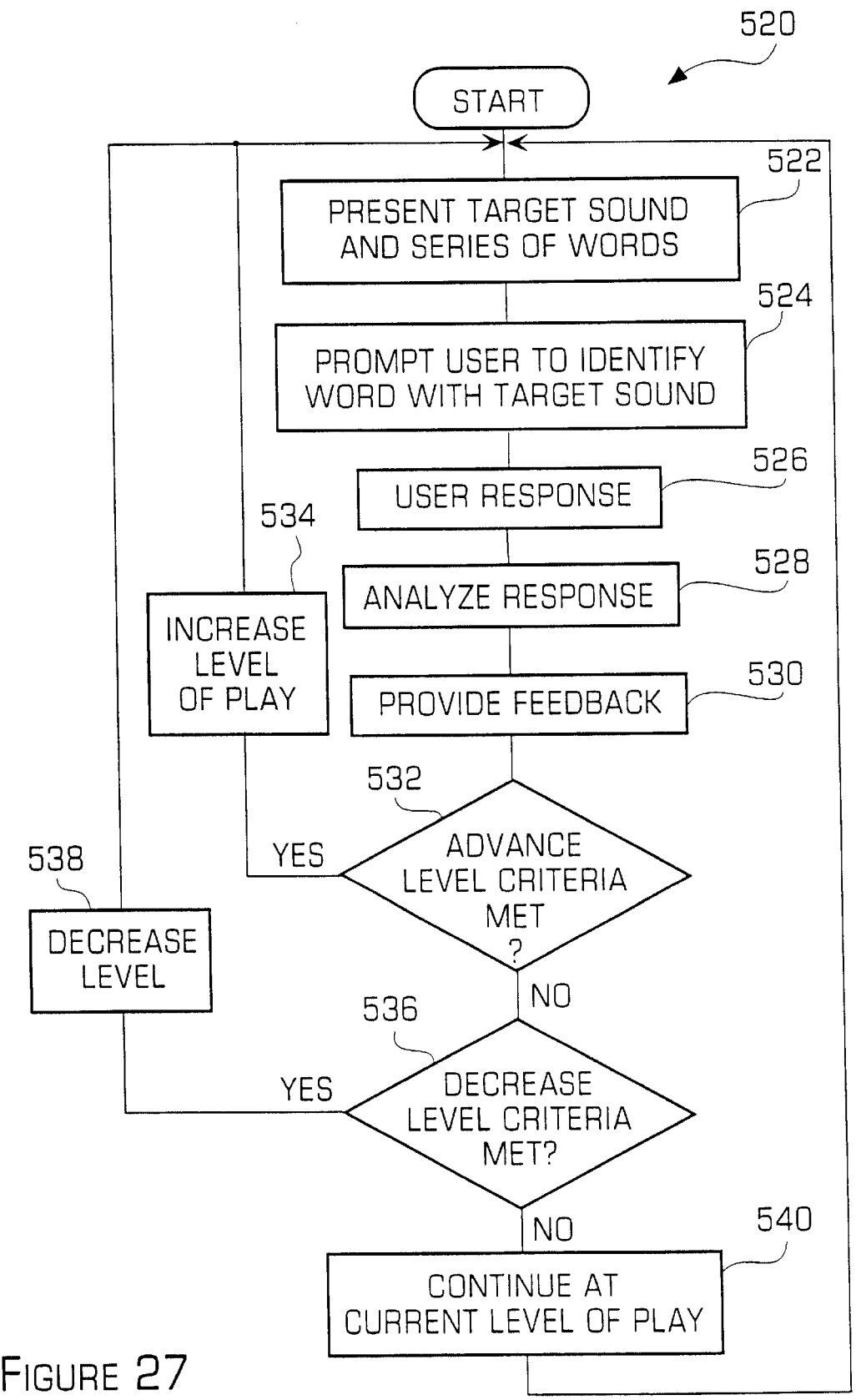
FIG. 27 is a diagram illustrating a third task of the sound identification training game in accordance with the invention.

FIG. 27 is a diagram illustrating a third task 520 of the sound identification training game in accordance with the invention. Although the method is being described as a single task, the single task in accordance with the invention may actually include multiple smaller sub-tasks wherein each sub-task may train a particular area within the skills or may vary a different difficulty variable (as described below). In step 522, the training module may audibly present a target sound and a series of words to the user and generate written or oral instructions for the user for the particular task. In step 524, the user is prompted to identify the word that contains the target sound. For example, the target sound may /b/ and a proper response is "ball". In step 526, the user enters a response to the module using one of the input devices, such as the keyboard, the mouse or the speech recognition device. In step 528, the module analyzes the user's response to determine, for example, the correctness of the user's response and performance of the user based on some performance criteria such as time elapsed during the response. In step 530, the module may provide the user with feedback 472 (shown in FIG. 29 as visual feedback, but it may also be auditory feedback) about the user's responses. In the example of the visual feedback shown in FIG. 29, a hippo score 474 may indicate a correct answer and a rhino score 476 may indicate an incorrect response.

In step 532, the module may determine if the user has met the advance level criteria (e.g. has the user answered three questions in a row correctly). In this task, a 3/2 adaptive training system is used in which the user must provide three correct responses in a row to advance to the next level and if the user provides two incorrect responses in a row, the user's level is decreased. If the user has met the advance level criteria, the module may increase the difficulty of the task in step 534. The difficulty of the task may be increased by changing one or more of a number of different difficulty variables in accordance with the invention. For example, the difficulty variables may include the acoustic and perceptual saliency of the target sound. After the level has been increased using one or more of the difficulty variables, the module may loop back to step 522.

If the user has not met the advance level criteria, the module may determine if the user has met the decrease level criteria (i.e., the user has provided two incorrect answers in a row) in step 536. If the user has met the decrease level criteria and thus need to have the difficulty of the task decreased, the module may decrease the level difficulty in step 538 by changing one or more of the above described difficulty variables and the method loops back to step 522. If the user has not met the decrease level criteria, then the method continues onto step 540 in which the task continues at the current difficulty level and loops back to step 522. Now, a fourth task of the sound identification module will be described.

Figure 28:
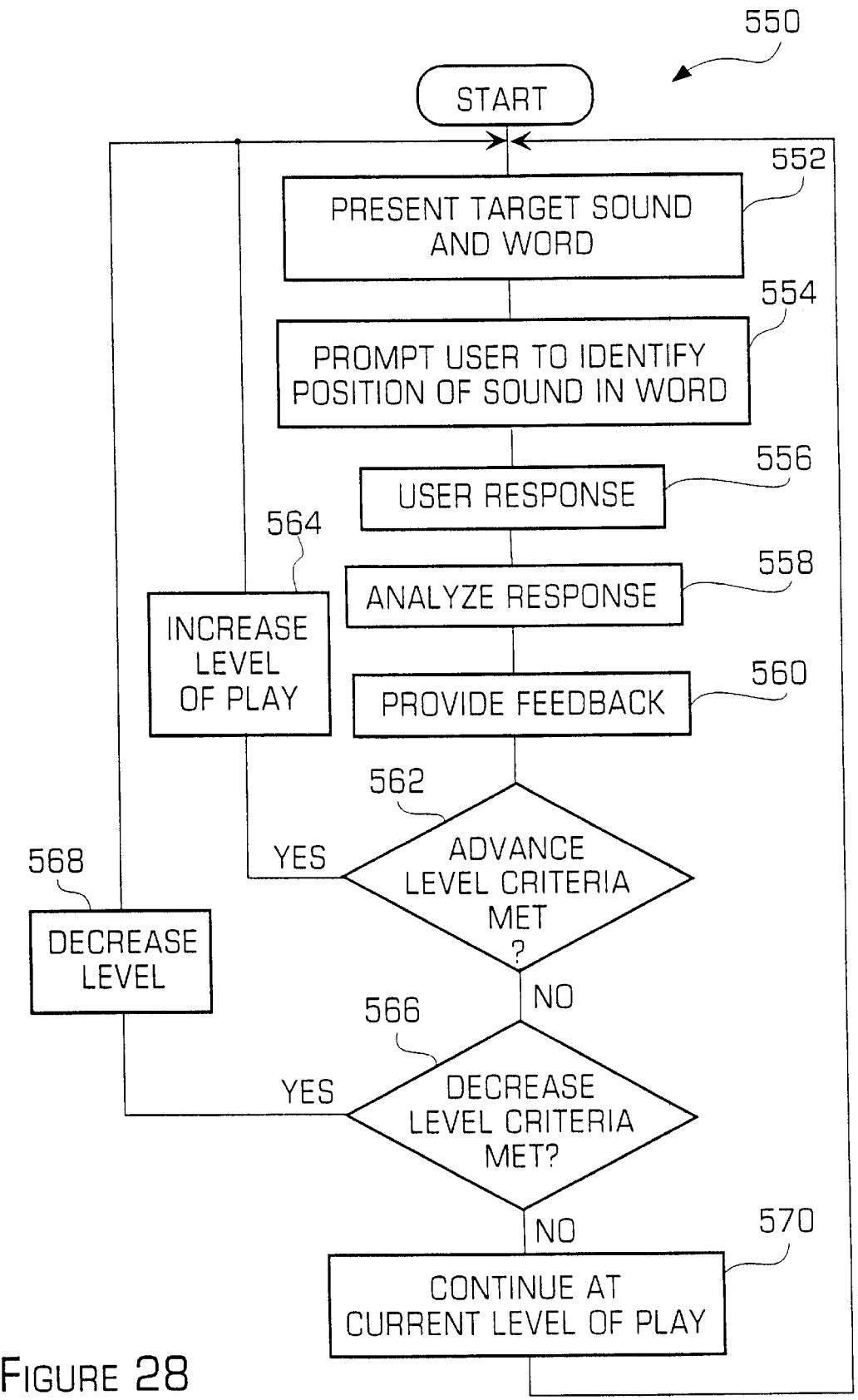
FIG. 28 is a diagram illustrating a fourth task of the sound identification training game in accordance with the invention.

FIG. 28 is a diagram illustrating a fourth task 550 of the sound identification training game in accordance with the invention. Although the method is being described as a single task, the single task in accordance with the invention may actually include multiple smaller sub-tasks wherein each sub-task may train a particular area within the skills or may vary a different difficulty variable (as described below). In step 552, the training module may audibly present a target sound and a word to the user and generate written or oral instructions for the user for the particular task. In step 554, the user is prompted to identify the position of the sound in the word. For example, the module may generate the sound /c/ and the word "cat" and the proper response is to identify the sound as being at the beginning of the word. In step 556, the user enters a response to the module using one of the input devices, such as the keyboard, the mouse or the speech recognition device. In step 558, the module analyzes the user's response to determine, for example, the correctness of the user's response and performance of the user based on some performance criteria such as time elapsed during the response. In step 560, the module may provide the user with feedback 472 (shown in FIG. 29 as visual feedback, but it may also be auditory feedback) about the user's responses. In the example of the visual feedback shown in FIG. 29, a hippo score 474 may indicate a correct answer and a rhino score 476 may indicate an incorrect response.

In step 562, the module may determine if the user has met the advance level criteria (e.g. has the user answered three questions in a row correctly). In this task, a 3/2 adaptive training system may be used in which the user must provide three correct responses in a row to advance to the next level and if the user provides two incorrect responses in a row, the user's level is decreased. If the user has met the advance level criteria, the module may increase the difficulty of the task in step 564. The difficulty of the task may be increased by changing one or more of a number of different difficulty variables in accordance with the invention. For example, the difficulty variables may include the acoustic and perceptual saliency of the sound. After the level has been increased using one or more of the difficulty variables, the module may loop back to step 552.

If the user has not met the advance level criteria, the module may determine if the user has met the decrease level criteria (i.e., the user has provided :two incorrect answers in a row) in step 566. If the user has met the decrease level criteria and thus need to have the difficulty of the task decreased, the module may decrease the level difficulty in step 568 by changing one or more of the above described difficulty variables and the method loops back to step 552. If the user has not met the decrease level criteria, then the method continues onto step 570 in which the task continues at the current difficulty level and loops back to step 552. Now, an example of the user interface and an example of the sub-tasks will be described.

Figure 29:
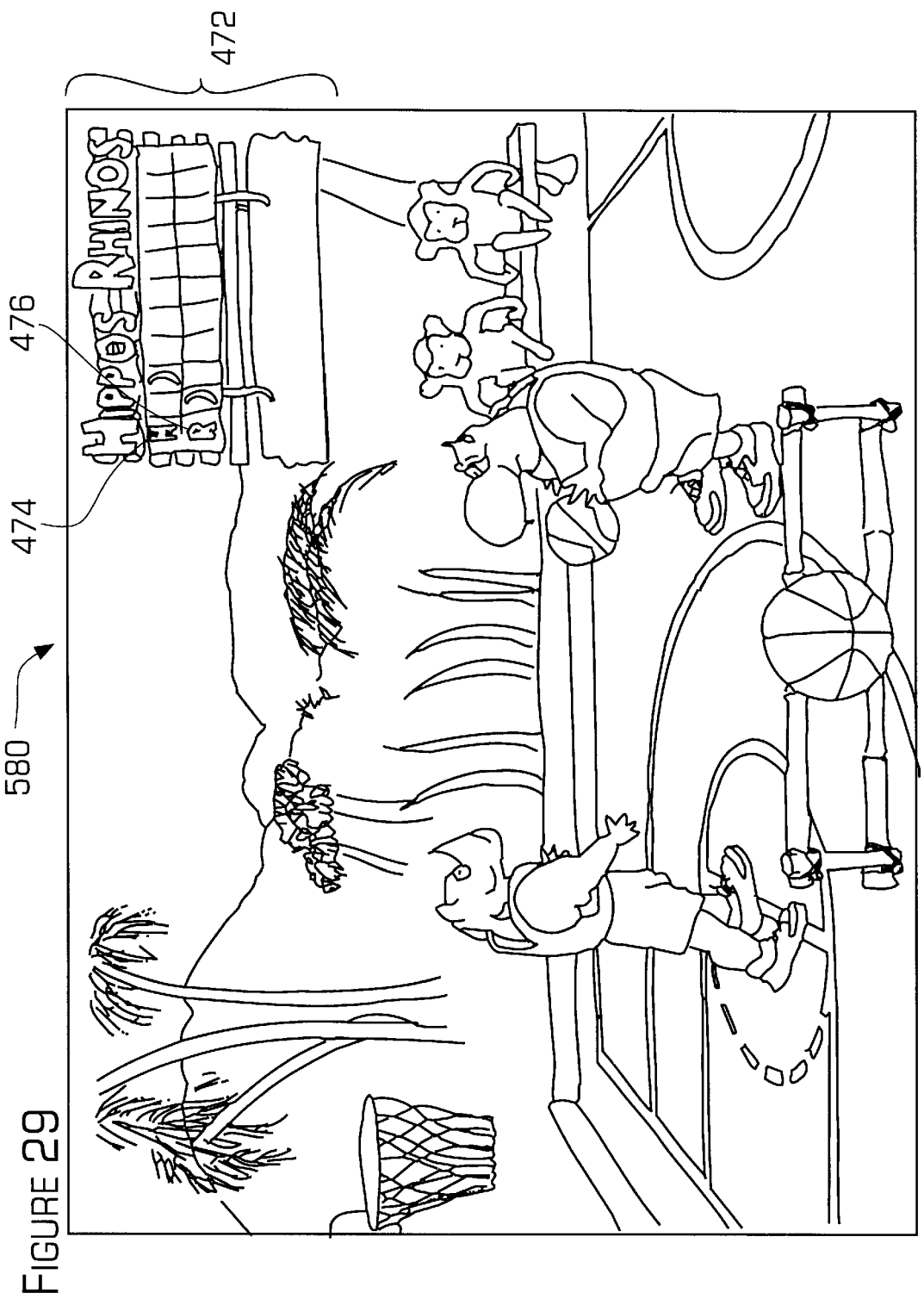
FIG. 29 is a diagram illustrating an example of the sound identification training game in accordance with the invention.
Figure 30:
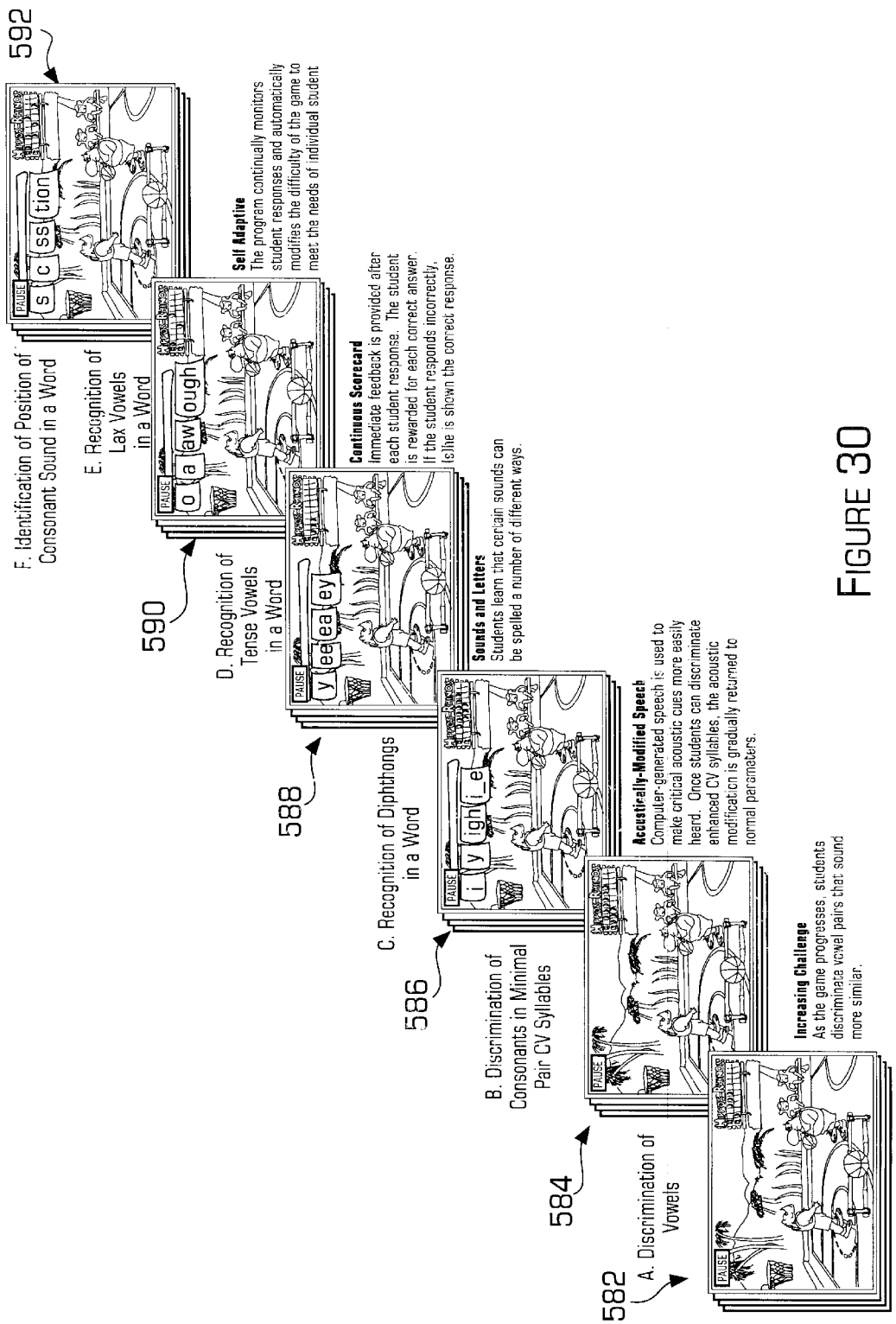
FIGS. 30A–30F are diagrams illustrating examples of different views of the sound identification training game of FIG. 29.

FIG. 29 is a diagram illustrating an example of the user interface 580 of the sound identification training game in accordance with the invention. In addition to the feedback 472, the user interface may also include a picture of a hippo (the user) shooting baskets against a rhino (the computer). In playing the game, the user may listen to a target sound (e.g., "e") and listen to series of words while holding down the mouse button. The user is then supposed to release the mouse button when the user hears the word containing the sound. FIGS. 30A–30F are diagrams illustrating examples of different views of the sub-tasks of the sound identification training game of FIG. 29. Each sub-task may use the same basic user interface of FIG. 29 with different sound stimulus. For example, FIG. 30A illustrates a sub-task 582 for training a user's discrimination of vowels, FIG. 30B illustrates a sub-task 584 for discriminating between consonants in minimal pair CV syllables, FIG. 30C illustrates a sub-task 586 for training a user's recognition of diphthongs in a word, FIG. 30D illustrates a sub-task 588 for training a user's recognition of tense vowels in a word, FIG. 30E illustrates a sub-task 590 for training a user's recognition of lax vowels in a word and FIG. 30F illustrates a sub-task 592 for training a user's identification of the position of a consonant sound in a word.

In summary, the sounds change identification module may include 155 levels that use natural and computer-generated speech to train users to discriminate vowels and consonant sounds. The user may also be trained to recognize sounds and to identify positions of sounds in words. In addition, sound-symbol correspondence for vowels, vowel digraphs, diphthongs consonants and consonant blends may be presented to the user. As described above, the difficulty of the training may be adaptively changed using the difficulty variables. Now, a preferred embodiment of the sound pattern recognition training module will be described.

Figure 31:
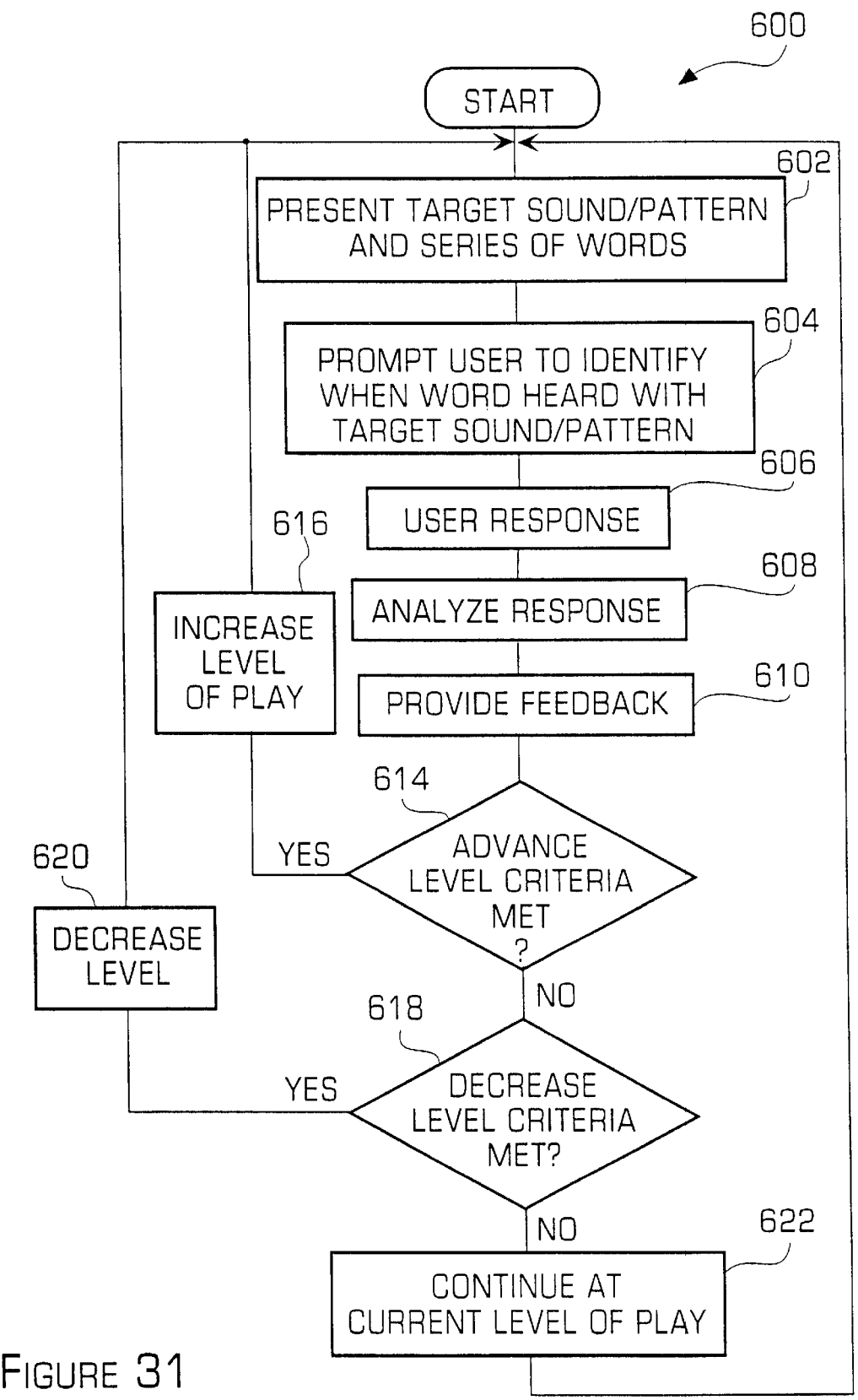
FIG. 31 is a diagram illustrating a first task of the sound pattern identification training game in accordance with the invention.

FIG. 31 is a diagram illustrating a first task 600 of the sound pattern recognition training game in accordance with the invention. Although the method is being described as a single task, the single task in accordance with the invention may actually include multiple smaller sub-tasks wherein each sub-task may train a particular area within the skills or may vary a different difficulty variable (as described below). In step 602, the training module may audibly present a target sound or target sound pattern and a series of words to the user and generate written or oral instructions for the user for the particular task. In step 604, the user is prompted to identify when the user hears the word that contains the target sound. For example, the target sound may /b/ and a proper response is "cab". In step 606, the. user enters a response to the module using one of the input devices, such as the keyboard, the mouse or the speech recognition device. In step 608, the module analyzes the user's response to determine, for example, the correctness of the user's response and performance of the user based on some performance criteria such as time elapsed during the response. In step 610, the module may provide the user with feedback 612 (shown in FIG. 35 as visual feedback, but it may also be auditory feedback) about the user's responses. In the example of the visual feedback shown in FIG. 35, a lightbulb 613 may illuminate to indicate a correct answer and a unilluminated light may indicate an incorrect answer.

In step 614, the module may determine if the user has met the advance level criteria (e.g. has the user answered three questions in a row correctly). In this task, a 3/2 adaptive training system may be used in which the user must provide three correct responses in a row to advance to the next level and if the user provides two incorrect responses in a row, the user's level is decreased. If the user has met the advance level criteria, the module may increase the difficulty of the task in step 616. The difficulty of the task may be increased by changing one or more of a number of different difficulty variables in accordance with the invention. For example, the difficulty variables may include the complexity of the sound pattern, the perceptual saliency of the sound pattern or the position in the word of the target sound. After the level has been increased using one or more of the difficulty variables, the module may loop back to step 602.

If the user has not met the advance level criteria, the module may determine if the user has met the decrease level criteria (i.e., the user has provided two incorrect answers in a row) in step 618. If the user has met the decrease level criteria and thus need to have the difficulty of the task decreased, the module may decrease the level difficulty in step 620 by changing one or more of the above described difficulty variables and the method loops back to step 602. If the user has not met the decrease level criteria, then the method continues onto step 622 in which the task continues at the current difficulty level and loops back to step 602. Now, a second task of the sound pattern recognition module will be described.

Figure 32:
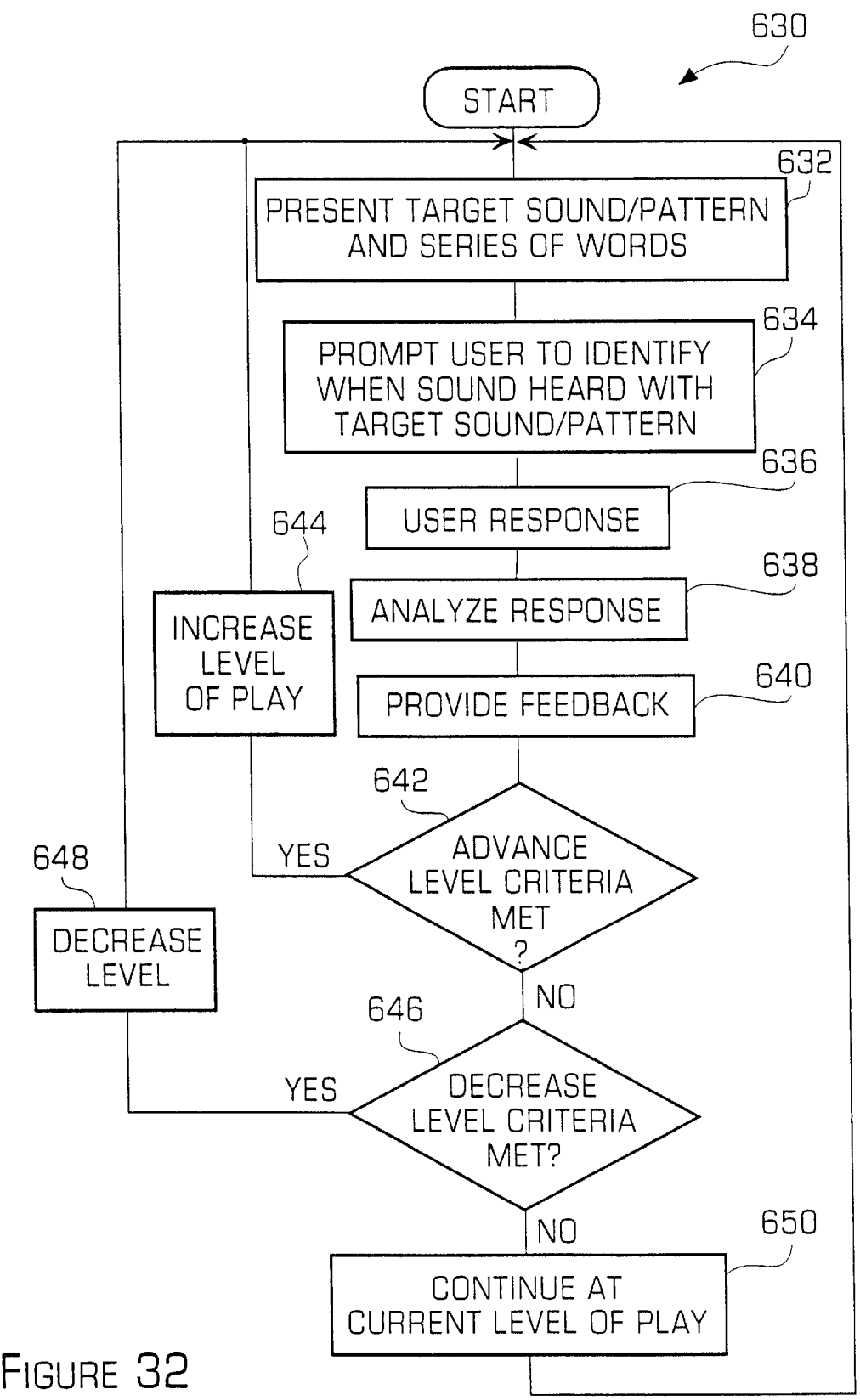
FIG. 32 is a diagram illustrating a second task of the sound pattern identification training game in accordance with the invention.

FIG. 32 is a diagram illustrating a second task 630 of the sound pattern recognition training game in accordance with the invention. Although the method is being described as a single task, the single task in accordance with the invention may actually include multiple smaller sub-tasks wherein each sub-task may train a particular area within the skills or may vary a different difficulty variable (as described below). In step 632, the training module may audibly present a target sound or target sound pattern and a series of words to the user and generate written or oral instructions for the user for the particular task. In step 634, the user is prompted to identify when the user hears the sound/word that contains the target sound. For example, the target sound may be /b/ and a proper response is "ball". In step 636, the user enters a response to the module using one of the input devices, such as the keyboard, the mouse or the speech recognition device. In step 638, the module analyzes the user's response to determine, for example, the correctness of the user's response and performance of the user based on some performance criteria such as time elapsed during the response. In step 640, the module may provide the user with feedback 612 (shown in FIG. 35 as visual feedback, but it may also be auditory feedback) about the user's responses. In the example of the visual feedback shown in FIG. 35, a light bulb 613 may illuminate to indicate a correct answer and a unilluminated light may indicate an incorrect answer.

In step 642, the module may determine if the user has met the advance level criteria (e.g. has the user answered three questions in a row correctly). In this task, a 3/2 adaptive training system is used in which the user must provide three correct responses in a row to advance to the next level and if the user provides two incorrect responses in a row, the user's level is decreased. If the user has met the advance level criteria, the module may increase the difficulty of the task in step 644. The difficulty of the task may be increased by changing one or more of a number of different difficulty variables in accordance with the invention. For example, the difficulty variables may include the complexity of the sound pattern, the perceptual saliency of the sound pattern or the position in the word of the target sound. After the level has been. increased using one or more of the difficulty variables, the module may loop back to step 632.

If the user has not met the advance level criteria, the module may determine if the user has met the decrease level criteria (i.e., the user has provided to incorrect answers in a row) in step 646. If the user has met the decrease level criteria and thus needs to have the difficulty of the task decreased, the module may decrease the level difficulty in step 648 by changing one or more of the above described difficulty variables and the method loops back to step 632. If the user has not met the decrease level criteria, then the method continues onto step 650 in which the task continues at the current difficulty level and loops back to step 632. Now, a third task of the sound pattern recognition module will be described.

Figure 33:
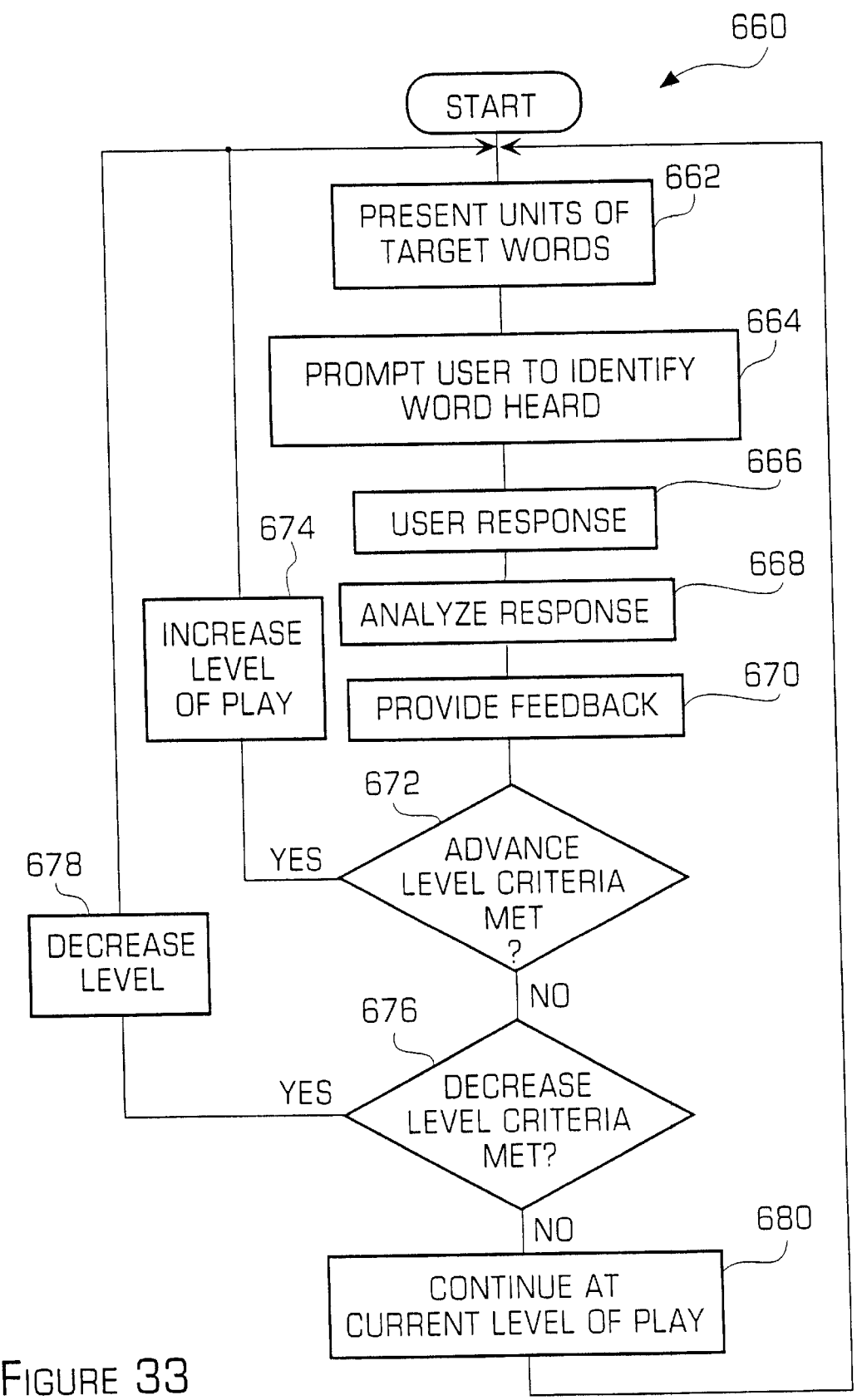
FIG. 33 is a diagram illustrating a third task of the sound pattern identification training game in accordance with the invention.

FIG. 33 is a diagram illustrating a third task 660 of the sound pattern recognition training game in accordance with the invention Although the method is being described as a single task, the single task in accordance with the invention may actually include multiple smaller sub-tasks wherein each sub-task may train a particular area within the skills or may vary a different difficulty variable (as described below). In step 662, the training module may audibly present one or more sound units of a target word to the user and generate written or oral instructions for the user for the particular task. In step 664, the user is prompted to identify the word heard. In step 666, the user enters a response to the module using one of the input devices, such as the keyboard, the mouse or the speech recognition device. In step 668, the module analyzes the user's response to determine, for example, the correctness of the user's response and performance of the user based on some performance criteria such as time elapsed during the response. In step 670, the module may provide the user with feedback 612 (shown in FIG. 35 as visual feedback, but it may also be auditory feedback) about the user's responses. In the example of the visual feedback shown in FIG. 35, a lightbulb 613 may illuminate to indicate a correct answer and a unilluminated light may indicate an incorrect answer.

In step 672, the module may determine if the user has met the advance level criteria (e.g. has the user answered three questions in a row correctly). In this task, a 3/2 adaptive training system is used in which the user must provide three correct responses in a row to advance to the next level and if the user provides two incorrect responses in a row, the user's level is decreased. If the user has met the advance level criteria, the module may increase the difficulty of the task in step 674. The difficulty of the task may be increased by changing one or more of a number of different difficulty variables in accordance with the invention. For example, the difficulty variables may include the complexity of the structure of the sound units, the time interval between the sound units and the presence or absence of background noise/ auditory interference (i.e., extraneous auditory stimuli presented between sound units). The complexity of the structure of the sound unit refers to the number and sequence of consonants and vowels. In this module, the number of consonants and vowels for the entire word is not changed, but instead for the onset only. For example, the module may preferably begin with a very simple sound structure of C ("s" for example), proceed to CC ("st" for example) and then finally to CCC ("str" for example). After the level has been increased using one or more of the difficulty variables, the module may loop back to step 662.

If the user has not met the advance level criteria, the module may determine if the user has met the decrease level criteria (i.e., the user has provided two incorrect answers in a row) in step 676. If the user has met the decrease level criteria and thus needs to have the difficulty of the task decreased, the module may decrease the level difficulty in step 678 by changing one or more of the above described difficulty variables and the method loops back to step 662. If the user has not met the decrease level criteria, then the method continues onto step 680 in which the task continues at the current difficulty level and loops back to step 662. Now, a fourth task of the sound pattern recognition module will be described.

Figure 34:
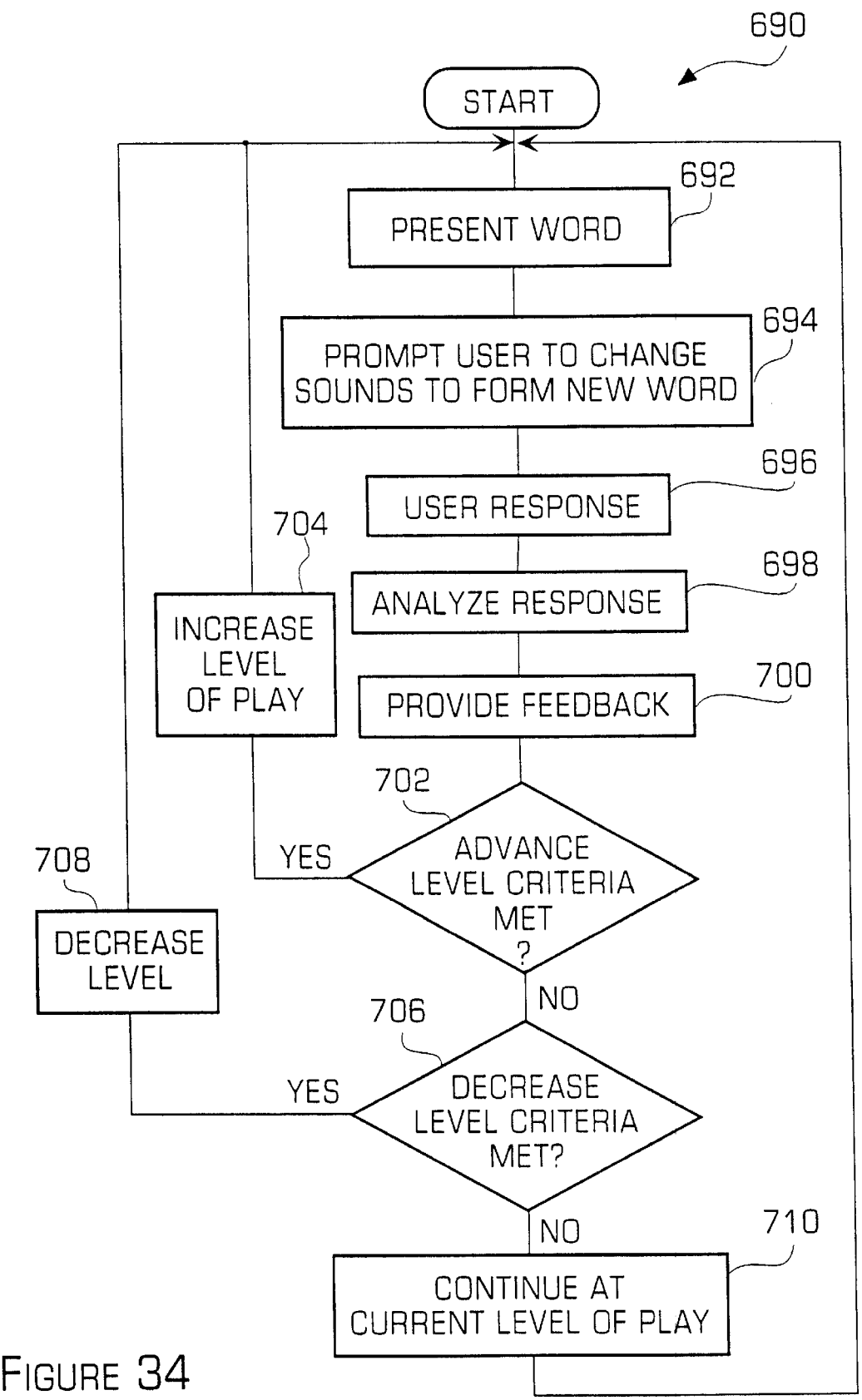
FIG. 34 is a diagram illustrating a fourth task of the sound pattern identification training game in accordance with the invention.

FIG. 34 is a diagram illustrating a fourth task 690 of the sound pattern recognition training game in accordance with the invention. Although the method is being described as a single task, the single task in accordance with the invention may actually include multiple smaller sub-tasks wherein each sub-task may train a particular area within the skills or may vary a different difficulty variable (as described below). In step 692, the training module may audibly present a word to the user and generate written or oral instructions for the user for the particular task. In step 694, the user is prompted to change the sounds in the word presented to the user to generate a new word. In step 696, the user enters a response to the module using one of the input devices, such as the keyboard, the mouse or the speech recognition device. In step 698, the module analyzes the user's response to determine, for example, the correctness of the user's response and performance of the user based on some performance criteria such as time elapsed during the response. In step 700, the module may provide the user with feedback 612 (shown in FIG. 35 as visual feedback, but it may also be auditory feedback) about the user's responses. In the example of the visual feedback shown in FIG. 35, a lightbulb 613 may illuminate to indicate a correct answer and a unilluminated light may indicate an incorrect answer.

In step 702, the module may determine if the user has met the advance level criteria (e.g. has the user answered three questions in a row correctly). In this task, a 3/2 adaptive training system is used in which the user must provide three correct responses in a row to advance to the next level and if the user provides two incorrect responses in a row, the user's level is decreased. If the user has met the advance level criteria, the module may increase the difficulty of the task in step 704. The difficulty of the task may be increased by changing one or more of a number of different difficulty variables in accordance with the invention. For example, the difficulty variables may include the syllabic structure of the word and the position of the sound that is being manipulated in the word. For example, the sound being manipulated may be at the beginning of a word, at the end of a word or in the middle of the word. After the level has been increased using one or more of the difficulty variables, the module may loop back to step 692.

If the user has not met the advance level criteria, the module may determine if the user has met the decrease level criteria (i.e., the user has provided two incorrect answers in a row) in step 706. If the user has met the decrease level criteria and thus need to have the difficulty of the task decreased, the module may decrease the level difficulty in step 708 by changing one or more of the above described difficulty variables and the method loops back to step 692. If the user has not met the decrease level criteria, then the method continues onto step 710 in which the task continues at the current difficulty level and loops back to step. 692. Now, several examples of the sound pattern recognition module will be described.

Figure 35:
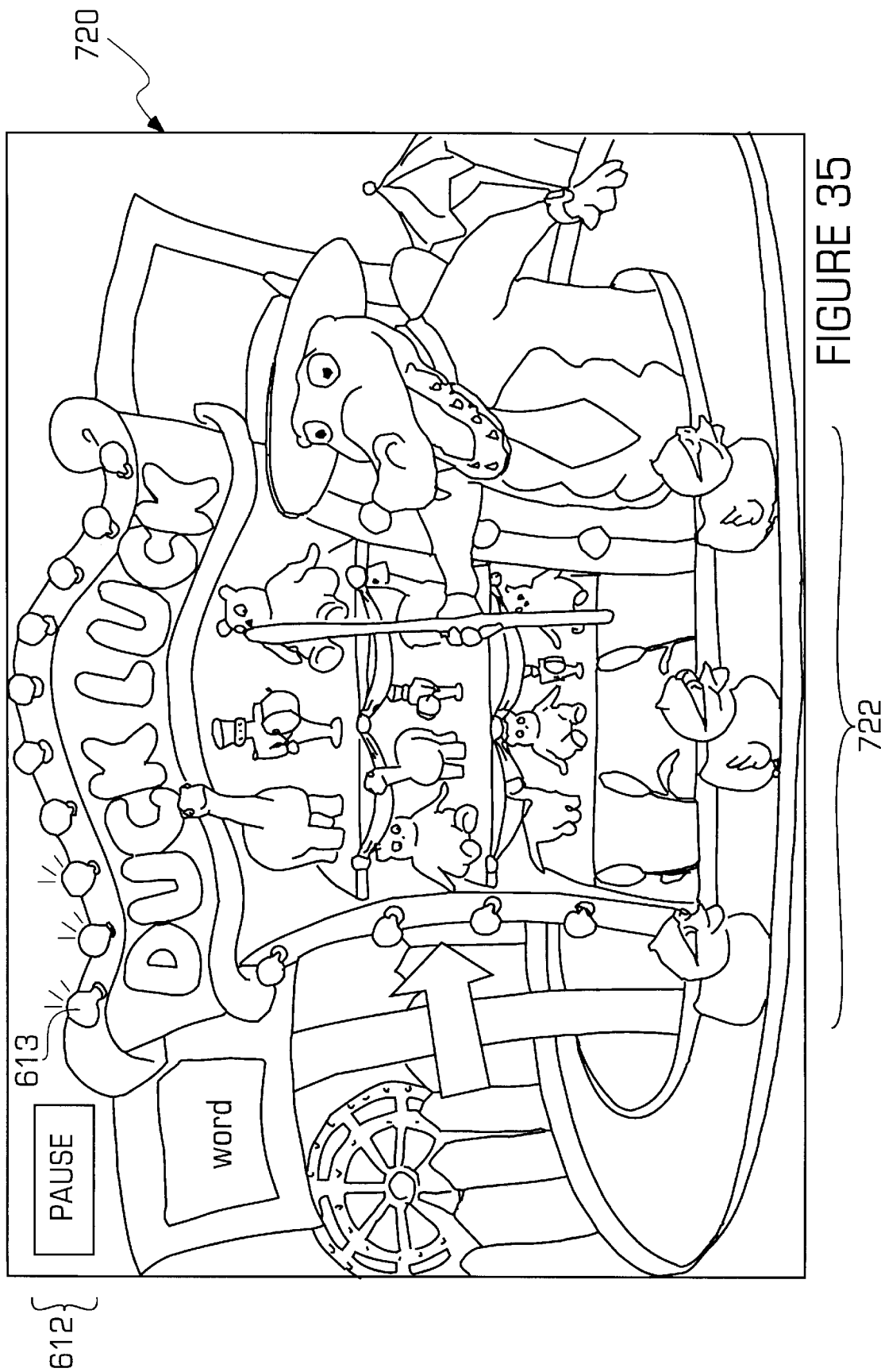
FIG. 35 is a diagram illustrating an example of the sound pattern identification training game in accordance with the invention.

FIG. 35 is a diagram illustrating an example of a user interface 720 of the sound pattern recognition training game in accordance with the invention. In addition to the feedback 612, the user interface may also include one or more ducks 722 which one or more different word endings. In particular, a user hears "Which duck says 'sip' with out the 's'?" and each duck may say a word ending. The user may then click on the duck that said the correct ending. FIGS. 36A–36D are diagrams illustrating examples of different views of sub-tasks of the sound pattern identification training game of FIG. 35. For example, FIG. 36A illustrates a recognizing word endings sub-task 730 in which the user may be asked to recognize rimes containining r-controlled vowels, rimes containing post-vocalic /l/, closed syllable rimes and open syllable rimes. An example of each type of word is shown in the drawing. FIG. 36B illustrates a recognizing word beginnings sub-task 732 in which the user is asked to recognize single consonant blends and consonant digraphs (with examples of each in the drawing), two-consonant blends and three-consonant blends. FIG. 36C illustrates a blending of onsets with rimes subtask 734 while FIG. 36D illustrates a segmenting sub-task 736 in which the user segments and/or deletes phonemes, onsets and rimes.

The sound pattern identification training module may include 142 different levels that train a user to rhyme, identify common sound and spelling patterns and to blend and segment onsets and rimes. In addition, sound-symbol correspondence for vowels, vowel digraphs and consonant blends may be presented to the user. As described above, the difficulty of the training may be adaptively changed using the difficulty variables.

In summary, the invention permits a user's skills at one or more auditory processing, phonological awareness, phonological-processing and reading skills to be trained so that the user may become a better reader. The various skills may be trained by the one or more training modules included in the system in accordance with the preferred embodiment of the invention. In accordance with a preferred embodiment of the invention, each training module may include one or more tasks (in the form of games) so that the user plays the game and, in order to master the game, learns certain skills. The skills may include, for example auditory attention, short term memory, figure-ground discrimination, sequential memory, temporal processing, pattern recognition, phoneme sequencing, phonological segmentation and phonological manipulation, phonological blending, auditory and phoneme discrimination, word closure, auditory performance with degraded signals, auditory vigilance, phoneme identification, phoneme sequencing, sight recognition, and rhyming. Each of the skills help the user to read and spell better since a person that has the auditory, phonological and reading skills are more likely to be able to read and spell.

While the foregoing has been with reference to a particular embodiment of the invention, it will be appreciated by those skilled in the art that changes in this embodiment may be made without departing from the principles and spirit of the invention, the scope of which is defined by the appended.

What is claimed is:

1. A method for training a user to discriminate a sound, comprising:

selecting a phonetic class of sounds to be presented to the user;

presenting a first and second sound to the user from the phonetic class of sounds; and selecting a second phonetic class of sounds to be presented to the user, the second phonetic class of sounds having a different perceptual saliency than the original phonetic class of sounds so that the difficulty of the sound discrimination changes based on the particular phonetic class of sounds being selected.

2. The method of claim 1, wherein the phonetic, class of sounds comprise one of vowels and consonants.

3. The method of claim 2, wherein the phonetic class of sounds further comprise short vowels and long vowels wherein the long vowels have more saliency that the short vowels.

4. The method of claim 2, wherein the phonetic class of sounds further comprise liquid consonants, stop consonants and nasal consonants wherein the liquid consonants are more salient than the stop consonants which are more salient than the nasal consonants.

5. A method for training a user to discriminate a sound, comprising:

selecting the phonetic context of sounds to be presented to the user;

presenting a first and second sound to the user based on the selected phonetic context of the sounds; and selecting a second phonetic context of sounds to be presented to the user, the second phonetic context of sounds having a different perceptual saliency than the original phonetic context of sounds so that the difficulty of the sound discrimination changes based on the particular phonetic context of sounds being selected.

6. The method of claim 5, wherein the phonetic context comprises presenting the sound isolated from other sounds.

7. The method of claim 5, wherein the phonetic context comprises presenting the sound in combination with another sound that makes it more difficult to perceive the sound.

8. An apparatus for training a user to discriminate between different sounds, comprising:

means for selecting a phonetic class of sounds to be presented to the user from a set of phonetic classes of sounds, wherein each phonetic class of sounds has a different perceptual saliency so that the difficulty of discriminating the sounds changes based on the selected phonetic class of sounds; and means for presenting a sound to the user from the selected phonetic class of sounds.

9. The apparatus of claim 8, wherein the phonetic class of sounds comprise one of vowels and consonants.

10. The apparatus of claim 8, wherein the phonetic class of sounds comprise short vowels and long vowels wherein the long vowels have more saliency that the short vowels.

11. The apparatus of claim 8, wherein the phonetic class of sounds comprise liquid consonants, stop consonants and nasal consonants wherein the liquid consonants are more salient than the stop consonants which are more salient than the nasal consonants.

12. An apparatus for training a user to discriminate between different sounds, comprising:

selecting a phonetic context of sounds to be presented to the user from a set of phonetic context of sounds, wherein each phonetic context of sounds has a different perceptual saliency so that the difficulty of discriminating the sounds changes based on the selected phonetic context of sounds; and presenting a sound to the user from the selected phonetic context of sounds.

13. The apparatus of claim 12, wherein the phonetic context comprises presenting the sound isolated from other sounds.

14. The apparatus of claim 12, wherein the phonetic context comprises presenting the sound in combination with another sound that makes it more difficult to perceive the sound.

15. A method for training a user to discriminate between different sounds, comprising:

selecting a phonetic class of sounds to be presented to the user from a set of phonetic classes of sounds, wherein each phonetic class of sounds has a different perceptual saliency so that the difficulty of discriminating the sounds changes based on the selected phonetic class of sounds.

16. The method of claim 15, wherein the phonetic class of sounds comprise one of vowels and consonants.

17. The method of claim 15, wherein the phonetic class of sounds comprise short vowels and long vowels wherein the long vowels have more saliency that the short vowels.

18. The method of claim 15, wherein the phonetic class of sounds comprise liquid consonants, stop consonants and nasal consonants wherein the liquid consonants are more salient than the stop consonants which are more salient than the nasal consonants.

19. A method for training a user to discriminate between different sounds, comprising:

selecting a phonetic context of sounds to be presented to the user from a set of phonetic context of sounds, wherein each phonetic context of sounds has a different perceptual saliency so that the difficulty of discriminating the sounds changes based on the selected phonetic context of sounds.

20. The method of claim 19, wherein the phonetic context comprises presenting the sound isolated from other sounds.

21. The method of claim 19, wherein the phonetic context comprises presenting the sound in combination with another sound that makes it more difficult to perceive the sound.

* * * * *